US012809658B2

(12) United States Patent
Juneja et al.

(10) Patent No.: US 12,809,658 B2
(45) Date of Patent: Nov. 24, 2026

(54) AUDIT ENGINE(S) FOR MONITORING AND MANAGING VIRTUAL NETWORK INTERFACE CONTROLLERS WITHIN A CLOUD-BASED ENVIRONMENT

(71) Applicant: Oracle International Corporation, Redwood City, CA (US)

(72) Inventors: Rohit Juneja, Stittsville (CA); Sandesh Pai, Chelmsford, MA (US)

(73) Assignee: Oracle International Corporation, Redwood City, CA (US)

( * ) Notice: Subject to any disclaimer, the term of this patent is extended or adjusted under 35 U.S.C. 154(b) by 364 days.

(21) Appl. No.: 18/666,484

(22) Filed: May 16, 2024

(65) Prior Publication Data

US 2025/0355693 A1 Nov. 20, 2025

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,473,400 | B1 * | 10/2016 | DeVilbiss ........... G06F 11/2033 | |
| 10,200,274 | B1 | 2/2019 | Suryanarayana et al. | |
| 11,316,822 | B1 | 4/2022 | Gawade et al. | |
| 11,765,244 | B1 | 9/2023 | Barclay et al. | |
| 11,777,848 | B2 * | 10/2023 | Tracy .................. G06F 9/45558 | 709/238 |
| 11,848,910 | B1 | 12/2023 | Zou et al. | |
| 11,895,020 | B1 | 2/2024 | Arham et al. | |
| 12,155,569 | B1 | 11/2024 | Cirkovic et al. | |
| 2009/0193413 | A1 * | 7/2009 | Lee ....................... G06F 9/4416 | 718/1 |

(Continued)

FOREIGN PATENT DOCUMENTS

| | | | |
|---|---|---|---|
| CN | 114372696 | A | 4/2022 |
| CN | 116155903 | A | 5/2023 |
| EP | 3716533 | A1 | 9/2020 |

OTHER PUBLICATIONS

Microsoft Azure; "How to find and delete unattached network interface cards (NICs) for Azure VMs"; Published: Apr. 9, 2018; (Azure_2018.pdf) (Year: 2018).*

(Continued)

*Primary Examiner* — Hiren P Patel

(57) ABSTRACT

Various embodiments of the present technology generally relate to a VnicSet operator system containing instructions to implement a process to manage a virtual network interface controller (Vnic) on an application pod of a containerized software environment, the Vnic being directly reachable from a network external to the containerized software environment. In an aspect, the process includes monitoring a plurality of Vnics created for deployment within the containerized software environment, each of the plurality of Vnics being associated with a respective application pod within the containerized software environment, determining one or more non-active Vnics within the plurality of Vnics, and rectifying the one or more non-active Vnics.

20 Claims, 9 Drawing Sheets

(56) References Cited

U.S. PATENT DOCUMENTS

| | | | | |
|---|---|---|---|---|
| 2009/0292858 | A1* | 11/2009 | Lambeth | G06F 9/45558 711/6 |
| 2013/0339547 | A1 | 12/2013 | Nath et al. | |
| 2015/0178235 | A1* | 6/2015 | Kanigicherla | H04L 41/0803 710/314 |
| 2016/0139949 | A1* | 5/2016 | Jagannath | G06F 9/5022 718/1 |
| 2017/0039166 | A1* | 2/2017 | Xu | G06F 15/7825 |
| 2017/0329644 | A1* | 11/2017 | Imamura | G06F 9/505 |
| 2018/0316769 | A1 | 11/2018 | Akers et al. | |
| 2020/0073692 | A1 | 3/2020 | Rao et al. | |
| 2020/0076685 | A1 | 3/2020 | Vaidya et al. | |
| 2020/0106834 | A1* | 4/2020 | Perez | H04L 67/1097 |
| 2020/0314015 | A1 | 10/2020 | Mariappan et al. | |
| 2020/0349023 | A1* | 11/2020 | Srinivasan | G06F 11/1451 |
| 2021/0328858 | A1 | 10/2021 | Asveren et al. | |
| 2022/0038309 | A1 | 2/2022 | Boutros et al. | |
| 2022/0116285 | A1 | 4/2022 | Abdollahi Vayghan et al. | |
| 2022/0116310 | A1 | 4/2022 | Tracy et al. | |
| 2022/0182318 | A1* | 6/2022 | Shilimkar | G06F 9/45558 |
| 2022/0240434 | A1* | 8/2022 | Rice | A01B 79/005 |
| 2022/0278927 | A1 | 9/2022 | Mariappan et al. | |
| 2022/0279420 | A1 | 9/2022 | Akkipeddi et al. | |
| 2022/0311738 | A1 | 9/2022 | Singh et al. | |
| 2022/0334864 | A1 | 10/2022 | K N et al. | |
| 2023/0028837 | A1 | 1/2023 | Wang et al. | |
| 2023/0216828 | A1 | 7/2023 | Singh et al. | |
| 2024/0126581 | A1 | 4/2024 | Nguyen et al. | |
| 2024/0241757 | A1 | 7/2024 | Karve et al. | |
| 2024/0248748 | A1* | 7/2024 | Jha | G06F 9/4856 |
| 2024/0291759 | A1 | 8/2024 | Jain et al. | |
| 2024/0406277 | A1 | 12/2024 | Henkel et al. | |
| 2024/0422107 | A1 | 12/2024 | Sharma et al. | |
| 2025/0007828 | A1 | 1/2025 | Nallamothu et al. | |
| 2025/0021367 | A1 | 1/2025 | Juneja et al. | |
| 2025/0023772 | A1 | 1/2025 | Juneja et al. | |
| 2025/0023844 | A1 | 1/2025 | Juneja et al. | |
| 2025/0030663 | A1 | 1/2025 | Ding et al. | |
| 2025/0097821 | A1 | 3/2025 | Akkipeddi et al. | |

OTHER PUBLICATIONS

Nathan Fishel; "Cost-Optimization"; "Introduction: The Hidden Cost of Orphaned Resources Every Azure Environment has . . . "; Published: Jan. 22, 2024; (Fishel_Jan2024.pdf) (Year: 2024).*

Jan David Narkiewicz; "Azure/PowerShell: Finding and Removing Orphaned Network Interfaces"; Published: Sep. 6, 2020; (Narkiewicz_2020.pdf) (Year: 2020).*

Shiraishi et al.; "Real-time Monitoring System for Container Networks in the Era of Microservices"; Fujitus Laboratories LTD.; (Shiraishi_2020.pdf) (Year: 2020).*

EBPF-based Networking, Observability, Security, Cilium—Linux Native, API-Aware Networking and Security for Containers [online], Cilium, 2022 [retrieved on Sep. 9, 2024]. Retrieved from the Internet: <URL: https://cilium.io>, 8 pages.

GitHub: lyft/cni-ipvlan-vpc-k8s: AWS VPC Kubernetes CNI driver using IPvlan [online], Lyft, 2022 [retrieved on Sep. 9, 2024]. Retrieved from the Internet: <URL: https://github.com/lyft/cni-ipvlan-vpc-k8s>, 11 pages.

International Search Report and Written Opinion for PCT App. No. PCT/US2024/037641, Authorized Officer Agudo Cortada, E., mailed Sep. 30, 2024, 15 pages.

International Search Report and Written Opinion in PCT/US2023/021685, mailed Aug. 31, 2023, 9 pages.

Jain R, Paul S. Network virtualization and software defined networking for cloud computing: a survey. IEEE Communications Magazine. Nov. 11, 2013;51(11):24-31.

Life of a Packet, Cilium Documentation, [online], 2021 [retrieved on Sep. 9, 2024]. Retrieved from the Internet: <URL: https://web.archive.org/web/20210417121721/https://docs.cilium.io/en/latest/concepts/ebpf/lifeofapacket>, 5 pages.

Mastering Kubernetes, Book [online], Sayfan G., 2017 [retrieved on May 2017]. Retrieved from the Internet: <URL: http://196.189.45.87/bitstream/123456789/40210/2/115.Gigi%20Sayfan.pdf>.

Oracle Cloud Infrastructure Service Mesh Documentation [online], Oracle Corporation, 2024 [retrieved on Sep. 9, 2024]. Retrieved from the Internet: <URL: https://docs.oracle.com/en-us/iaas/Content/service-mesh/home.htm>, 2 pages.

Oracle Cloud Infrastructure Service Mesh, Datasheet [online], Oracle Corporation, 2024 [retrieved on Sep. 9, 2024]. Retrieved from the Internet: <URL: https://www.oracle.com/cloud/cloud-native/service-mesh/>, 7 pages.

Wang, Xiaomin, "Orchestrating data governance workloads as stateful services in cloud environments using Kubernetes Operator Framework," Master Thesis, University of Stuttgart, Dec. 9, 2022, 85 pages.

Balla et al., Adaptive scaling of Kubernetes pods, 2020, NOMS 2020—2020 IEEE/IFIP Network Operations and Management Symposium, pp. 1-5.

Anonymous, "Use Multus CNI in Kubernetes" Devopstales, Jan. 14, 2022, pp. 1-14.

International Search Report and Written Opinion for PCT Application No. PCT/US2024/037645 mailed Nov. 5, 2024, 9 pages.

* cited by examiner

AUDIT ENGINE(S) FOR MONITORING AND MANAGING VIRTUAL NETWORK INTERFACE CONTROLLERS WITHIN A CLOUD-BASED ENVIRONMENT

TECHNICAL FIELD

Various embodiments of the present technology generally relate to improvements to internet protocol (IP)-based communications capabilities of a software container environment, such as Kubernetes® (sometimes stylized as K8s). More specifically, embodiments of the present technology relate to systems and methods for improved network functionality in a cloud-based environment, such as to implement a custom operator that provides an audit engine to monitor and manage external resources.

BACKGROUND

Mobile communications, encompassing cellular and Voice over Internet Protocol (VoIP) technologies, stand as integral pillars of contemporary society. The infrastructure sustaining mobile communications comprises numerous components and network functions, obligated to adhere to stringent standards in data and media throughput, failover management, performance, and reliability. Among these functions lies the session border controller (SBC), featuring specialized elements tasked with regulating and safeguarding Internet Protocol (IP) communication streams, such as internet telephony and IP video transmissions. However, conventional components like SBCs employed in mobile communication networks typically entail bulky, costly equipment prone to maintenance challenges and scalability limitations.

Transitioning communication infrastructure functionalities from hardware-based setups to software-defined networking presents a promising solution to alleviate these obstacles. Containerized software deployment and orchestration platforms like Kubernetes have emerged as one approach for deploying software systems in cloud environments, facilitating swift and seamless resource scaling on hosted cloud servers. By leveraging cloud-based deployment, communication service providers can avoid extensive alterations to private server infrastructure and enjoy enhanced flexibility and agility in scaling their services.

Nonetheless, platforms like Kubernetes exhibit fundamental constraints that make them less than ideal candidates to support mobile communications services and network functions. These constraints include, among others, restricted media throughput, unreliable and inconsistent availability of IP addresses, disparities in ingress and egress communication routes, and limited failover capabilities essential for maintaining uninterrupted high-availability (HA) service during communication sessions. Consequently, there arises a pressing necessity for enhanced implementations of cloud-based network functions to address these shortcomings effectively.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing audit engines for monitoring and managing virtual network interface controller or cards (Vnics) created for deployment within containerized software environments. As will be expanded on in greater detail below, Vnics may be used to provide direct access to an application pod or microservice running within a containerized environment, such as Kubernetes. There are various scenarios, however, where Vnics may be created but never activated (e.g., deployed). These "leaked" Vnics may remain inactive (while potentially still consuming resources, creating resource conflicts, etc.) and may not be detectable by current systems and techniques.

To monitor and manage Vnics throughout their respective lifecycles, the audit engine provided herein may monitor for trigger events that may impact underlying resources or application pods. For example, the audit engine may monitor for create, update, or delete events for underlying resources or application pods. Upon detection of an event, the audit engine may request annotations from the containerized environment and extract VnicTags from the annotations. In some embodiments, based on the annotations, the audit engine may determine one or more non-active Vnics. In some cases, such as a create event, the audit engine may determine that a Vnic tag does not exist for a respective resource or pod.

Based on the status of the Vnic (e.g., non-active vs. non-existent) and the status of an underlying resource or application pod, the audit engine may take one or more rectification steps. The rectification steps may either activate a non-active Vnic or decommission (e.g., delete) a non-active Vnic. In cases where the Vnic is non-existent, the audit engine may initiate a Vnic creation process in which a VnicSet operator creates a new Vnic based on the initiating event. As will be expanded on below, by monitoring and managing Vnics throughout their lifecycle, the audit engine can minimize "leaked" or redundant Vnics, thereby improving the overall scalability and reliability of the cloud infrastructure.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
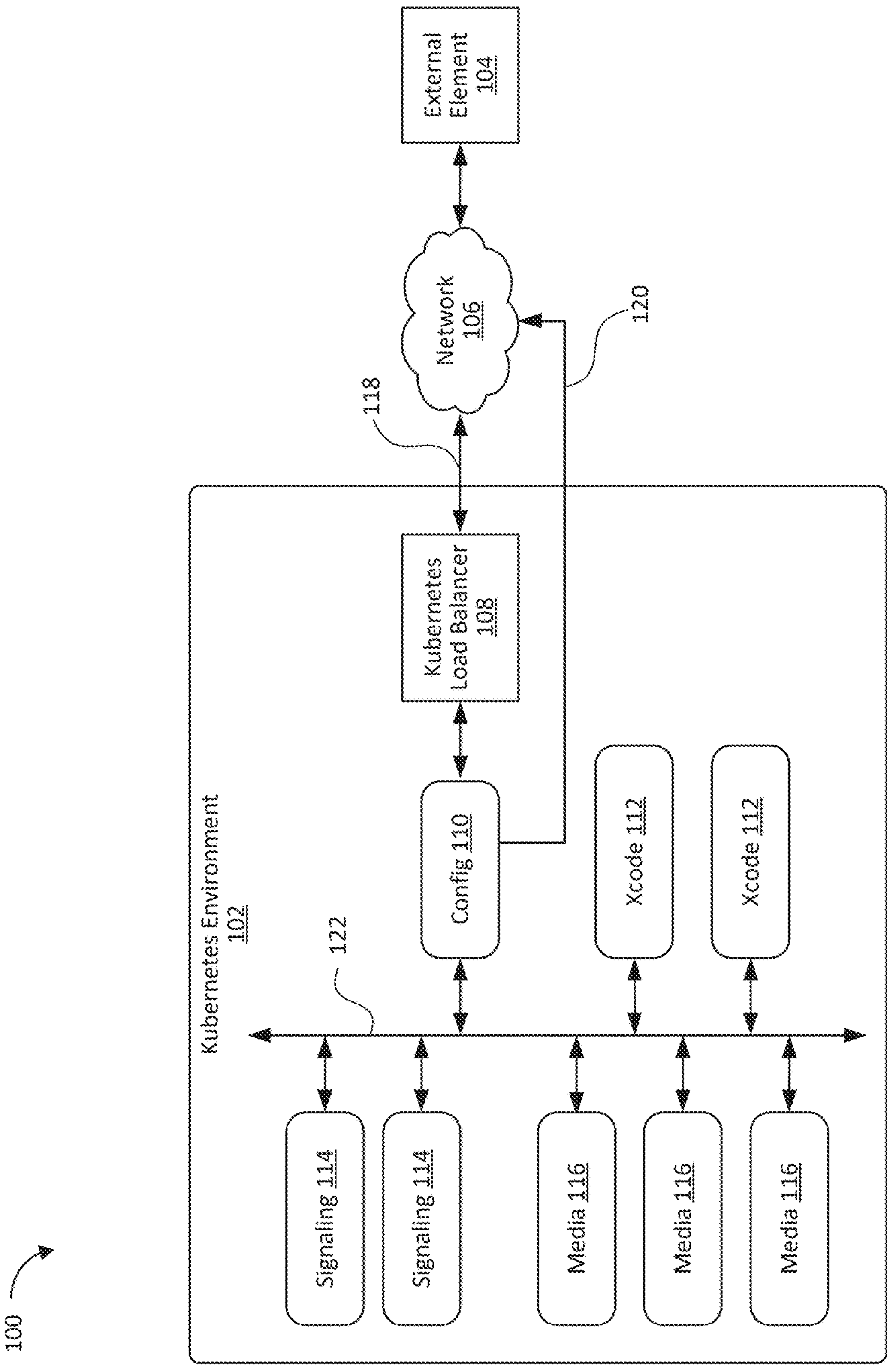
FIG. 1 illustrates an example operational environment in which assets may be deployed, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Containerized software environments, exemplified by platforms like Kubernetes, are experiencing a surge in popularity for several compelling reasons. Firstly, they offer unparalleled agility and scalability, allowing developers to package applications and their dependencies into portable, lightweight containers that can run consistently across various environments. This consistency streamlines the development, testing, and deployment processes, accelerating time-to-market and enhancing operational efficiency. Additionally, containerization promotes resource utilization optimization, enabling organizations to maximize infrastructure investments and efficiently manage computational resources. Moreover, Kubernetes, with its robust orchestration capabilities, automates the deployment, scaling, and management of containerized applications, simplifying complex tasks and reducing operational overhead. This combination of flexibility, efficiency, and automation makes containerized software environments like Kubernetes indispensable in modern software development and deployment landscapes, driving their widespread adoption across industries.

One notable drawback, however, of containerized software environments like Kubernetes is the challenge of enabling direct external communications to reach specific microservices or application pods. Kubernetes pods are encapsulated within a private network by default, limiting their accessibility from external sources for security reasons. While Kubernetes offers solutions like services and ingresses to facilitate external communication, configuring these components can be complex and error-prone, particularly in dynamic or large-scale deployments. Additionally, managing network policies and security configurations to control inbound and outbound traffic further adds to the complexity. This limitation complicates the implementation of certain network-dependent features and can introduce latency or reliability issues in distributed systems.

To provide direct access to microservices or application pods within the Kubernetes environment, virtual network interface controllers or cards (Vnics) may be created and injected into respective application pods. As will be described in greater detail below, these Vnics provide a direct communication channel between the application pods and external networks. To implement and manage Vnics, custom operators, such as a VnicSet operator, may be deployed within the Kubernetes environment. Example Vnics and VnicSet operators are described in U.S. application Ser. No. 18/351,810, titled CLOUD BASED NETWORK FUNCTION, U.S. application Ser. No. 18/351,835, titled VIRTUAL IP FOR A CONTAINER POD, and U.S. application Ser. No. 18/351,861, titled CLOUD NETWORK SERVICE MANAGEMENT, each of which is incorporated by reference herein.

As Vnics are created for deployment within application pods in the Kubernetes environment, situations can occur in which a Vnic becomes inactive or is leaked. That is, after creating a Vnic, but prior to deploying the Vnic into a respective pod, the VnicSet operator may crash or fail. In an example, the Vnic may be assigned to a port for a corresponding virtual machine (VM), but before the Vnic is attached to a worker node, the VnicSet operator may crash. When the VnicSet operator restarts, the VnicSet operator may be unaware of the assigned Vnic because it was not attached and may thus recreate another Vnic. As a result, there may be two Vnics created for the same resource or pod, assigned to two separate ports. While one of these Vnics may be active after attachment and injection into a respective pod, the other Vnic may remain inactive.

As those skilled in the art readily appreciate, non-active Vnics can cause several adverse outcomes. For instance, unused Vnics not only waste valuable resources but also pose potential networking conflicts and inefficiencies. A common scenario involves a Vnic being allocated to a port by the cloud provider, such as attaching it to a worker node, yet failing to be utilized, thus remaining inactive. This scenario may lead to conflicts when multiple instances of Vnics are assigned to the same pod, potentially causing communication errors and instability within the Kubernetes cluster. Moreover, redundant Vnics introduce unnecessary complexity, complicating troubleshooting and maintenance of the cluster's networking setup. Furthermore, excessive port allocation without utilization can lead to port exhaustion, hampering the scalability and performance of both the Kubernetes environment and the cloud provider's infrastructure. In summary, non-active Vnics represent a significant risk to the reliability, efficiency, and scalability of Kubernetes deployments.

To address these issues caused by non-active Vnics, an example VnicSet operator containing an audit engine is provided herein. As will be described in greater detail below, a VnicSet operator may include an audit engine that monitors Vnics as they are created and deployed within a containerized software environment, such as Kubernetes. During monitoring, the audit engine may determine non-active Vnics. In some cases, the audit engine may determine a status of resources or pods associated with a non-active Vnic to determine whether the non-active Vnic should be activated (e.g., attached and/or injected) or whether the non-active Vnic should be decommissioned (e.g., deleted). In some cases, the VnicSet operator may determine that instead of a non-active Vnic, no Vnic exists based on an event and as such create a new Vnic.

Based on the status of a Vnic, the audit engine of the VnicSet operator may determine and perform one or more rectification steps. Depending on the status of the Vnic and the underlying resources/pod, the audit engine may activate the non-active Vnic via an attachment process or injection process, or the audit engine may decommission the non-active Vnic. In the cases where the audit engine determines that a Vnic is non-existent, then the VnicSet operator may create a new Vnic and activate the new Vnic.

By monitoring and rectifying non-active and non-existent Vnics, the VnicSet operator containing the audit engine not only improves deployments within the containerized software environment, but the VnicSet operator also improves the overall cloud infrastructure. By ensuring that Vnics are actively utilized, organizations can optimize resource allocation and mitigate wastage, thereby improving cost-effectiveness. Additionally, minimizing non-active Vnics can resolve or prevent networking conflicts and inefficiencies to stabilize and enhance the reliability of Kubernetes clusters, fostering smoother communication and reducing the risk of downtime or service interruptions. That is, by simplifying the networking configuration through the elimination of redundant (e.g., non-active) Vnics, the VnicSet operator streamlines management tasks, making it easier to troubleshoot issues and maintain the overall system. Moreover, by preventing port exhaustion and optimizing port utilization, the VnicSet operator can enhance the scalability and performance of both the Kubernetes environment and the underlying cloud infrastructure. Ultimately, by addressing non-active Vnics, the audit engine of the VnicSet operator provides for more efficient, resilient, and scalable Kubernetes deployments, supporting the success of modern cloud-native applications.

Turning now to the Figures, FIG. 1 illustrates an example system 100 configured to implement cloud network service management, according to an embodiment herein. The system 100 may include one or more Kubernetes containerized software environments 102, one or more external elements 104, and one or more networks 106. The Kubernetes environment 102 may include a load balancer module 108, and one or more microservices, applications, or computing pods, such as configuration module 110, transcoding (xcode) module 112, signaling module 114, and media module 116. The modules within Kubernetes environment 102 may communicate via an internal pod networking path 122. Elements of the Kubernetes environment 102 may be connected to external network 106 via an ingress path 118 into the Kubernetes environment 102, and an egress path 120 out of the Kubernetes environment. Elements of system 100 may be implemented via computers, servers, hardware and software modules, or other system components. Elements of system 100 may also include or have access to one or more data storage devices, data storage mediums, data storage servers, and related data structures such as databases, which may store data files, executable code, or other information.

In the Kubernetes environment 102, applications or microservices may be executed by pods, which may be a unit of computing. In system 100, various microservices, such as config 110, transcoding 112, signaling 114, and media 116, may be executed on one or more pods in the Kubernetes environment 102. These microservices may be used for managing and processing communication streams for a mobile communications network provider. For example, external element 104 may include a communications device or networking component involved in a communication session. Media from external element 104 may be transmitted via network 106 (e.g., the internet or some other data network external to the Kubernetes environment 102) along an ingress path 118 to the Kubernetes environment 102.

The ingress path 118 may pass through a Kubernetes load balancer 108, before the communications messages are provided to a pod or application such as config module 110. The load balancer 108 may perform processing on incoming messages to distribute workload among resources within the Kubernetes environment 102, and in a default Kubernetes setup may always be situated along the ingress path 118 for network communications. From the perspective of a mobile communications service provider, the additional overhead of the load balancer 108 may be undesirable for real-time transport protocol (RTP) and user datagram protocol (UDP) traffic. Data from network 106 intended for a particular microservice 110-116 may need to go through load balancer 108 first, and potentially be routed through Kubernetes' internal pod network 122. Pods may only have one interface (e.g., to Kubernetes pod network 122), and trusted and untrusted segregation cannot be implemented at the network level. Therefore, external communications (e.g., from network 106) may not be able to reach a desired microservice or pod directly. IP addresses for pods may be ephemeral (e.g., generated based on a need and dissolved afterward), so that it is not known ahead of time what the IP address for a pod will be, and if the pod or application is restarted, the IP address may change. The default Kubernetes pod interface may be low capacity and not suited for media traffic, such as VoIP and IP video communications streams, and may not run accelerated networking technologies such as single root I/O virtualization (SR-IOV or SRIOV) or data plane development kit (DPDK). Further, messaging exiting the Kubernetes environment 102 may be along an egress path 120 different than the ingress path 118, bypassing the load balancer 108.

To allow an additional access to the application pods within the Kubernetes environment 102, outside of the ingress path 118 and the egress path 120, additional interfaces may be added to the application pods. In particular, a virtual network interface controller or card (Vnic) may be injected into the Kubernetes environment 102, specifically into a respective pod or microservice 110-116) to allow external work or communications (e.g., from the network 106) to reach the microservices 110-116 directly via externally reachable IP support, and the IP address for the microservices can be known beforehand. As those skilled in the art readily appreciate, a Vnic is a software-based representation of a physical network interface card within a virtualized environment. In traditional physical networking, a network interface card (NIC) is a hardware component that connects a computer or server to a network, allowing it to send and receive data over that network. However, in virtualized environments such as virtual machines (VMs) or containerized environments, Vnics are used to provide networking capabilities to virtualized instances. A Vnic operates similarly to a physical NIC but exists purely in software. As such, the Vnic has its own unique identifier and configuration settings, including IP address, subnet mask, and routing information. Vnics allow virtualized instances, such as VMs or containers, to communicate with each other and with external networks just like physical machines. As such, when injected into an application pod, the Vnic allows external networks, such as the network 106 to directly connect with the pod.

In an example, a Vnic may provide a known IP address reachable from an external network in handling a session initiation protocol (SIP) phone call, where a signaling path will be set up. The IP address for microservices 110-116 may be configured to stay consistent even after the pod or microservice restarts or fails. As such, a Vnic may provide the same ingress and egress path via a direct connection between pods and external networks 106. An example use case in which maintaining the same ingress and egress path may be important involves handling media packets in RTP communications, where media packets should come in and go out along the same media path.

Additionally, Vnics may provide support for virtual IP (VIP) addressing. With the additional interfaces and associated handling described herein, a mobile communications service provider may handle high-throughput media and packet-routing via a cloud application in a system such as Kubernetes. These improvements may apply to various networking and protocol types having similar requirements, such as 4G, 5G, internet of things (IoT), SIP, Diameter, RTP, real-time transport control protocol (RTCP), internet protocol security (IPsec), internet key exchange (IKE), etc.

Figure 2:
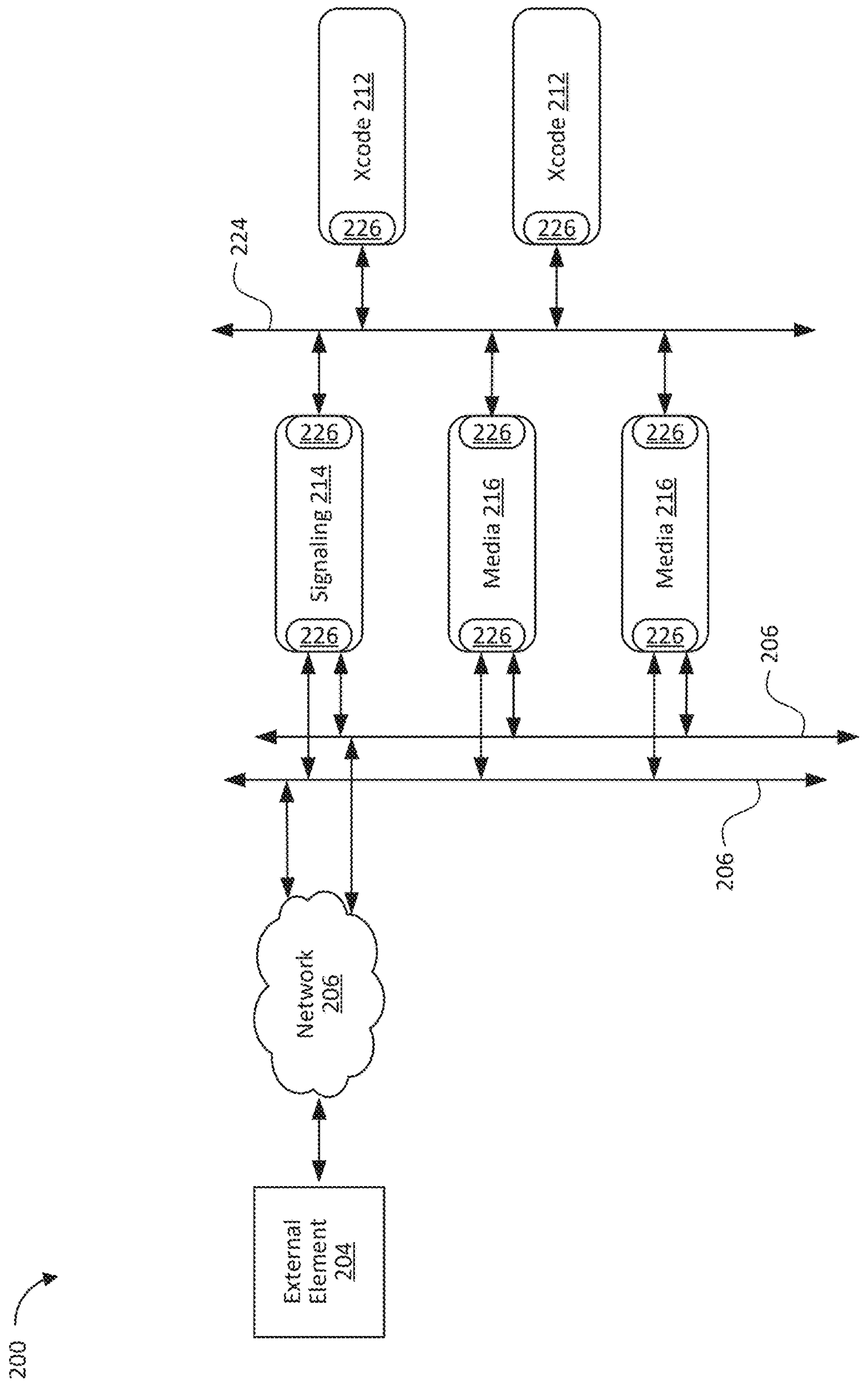
FIG. 2 illustrates an example system configured to implement cloud network management including Vnics, according to an embodiment herein.

Referring now to FIG. 2, an example system 200 configured to implement cloud network service management including Vnics 226 is provided, according to an embodiment herein. In particular, the system 200 may depict an embodiment in which containerized applications or pods have additional interfaces added, enabling direct connection with external networks that is not controlled by a containerized application system such as Kubernetes. The system 200 may include an external element 204 (e.g., a SIP peer), one or more external networks 206, and a plurality of containerized applications or microservices running on pods, such as transcoding module 212, signaling module 214, and media module 216. Further, the additional interfaces may enable modules 212-216 to communicate via an internal network 224, which may be different from the Kubernetes pod network 122 illustrated in FIG. 1.

As illustrated, the additional interfaces may be implemented via Vnics 226. The Vnics may not be directly managed by Kubernetes. Instead, the Vnics 226 enable bypassing of the Kubernetes infrastructure and limitations encompassed by it, such as those described above with respect to FIG. 1. The pods or microservices 212-216 with Vnics 226 can communicate directly with external networks 206 via consistent ingress and egress paths, without going through the Kubernetes load balancer 108. Further, the Vnics 226 can be assigned persistent VIPs that may be known before instantiation of a pod or microservice 212-216 and remain consistent even if the pod or microservice is restarted.

The implementation of the Vnics 226 may be automated and controlled via one or more operators added to a control plane of the Kubernetes environment, or similar control system of other containerized software systems. As noted above, examples of automation and control of the Vnics 226 are described in provided in U.S. application Ser. No. 18/351,810, titled CLOUD BASED NETWORK FUNCTION, U.S. application Ser. No. 18/351,835, titled VIRTUAL IP FOR A CONTAINER POD, and U.S. application Ser. No. 18/351,861, titled CLOUD NETWORK SERVICE MANAGEMENT, each of which is incorporated by reference herein.

The Vnics 226 may be automated and/or controlled via one or more operators, such as a VnicSet operator, configured to know what application to initiate, how to initiate it, what additional resources the application needs, on and which node the application will be spawned. On that node, the one or more operators may create the required network interface, inject it to the appropriate pod or application and associate a virtual IP, while bypassing the limitations of the Kubernetes system. This process is described in greater detail below.

Figure 3:
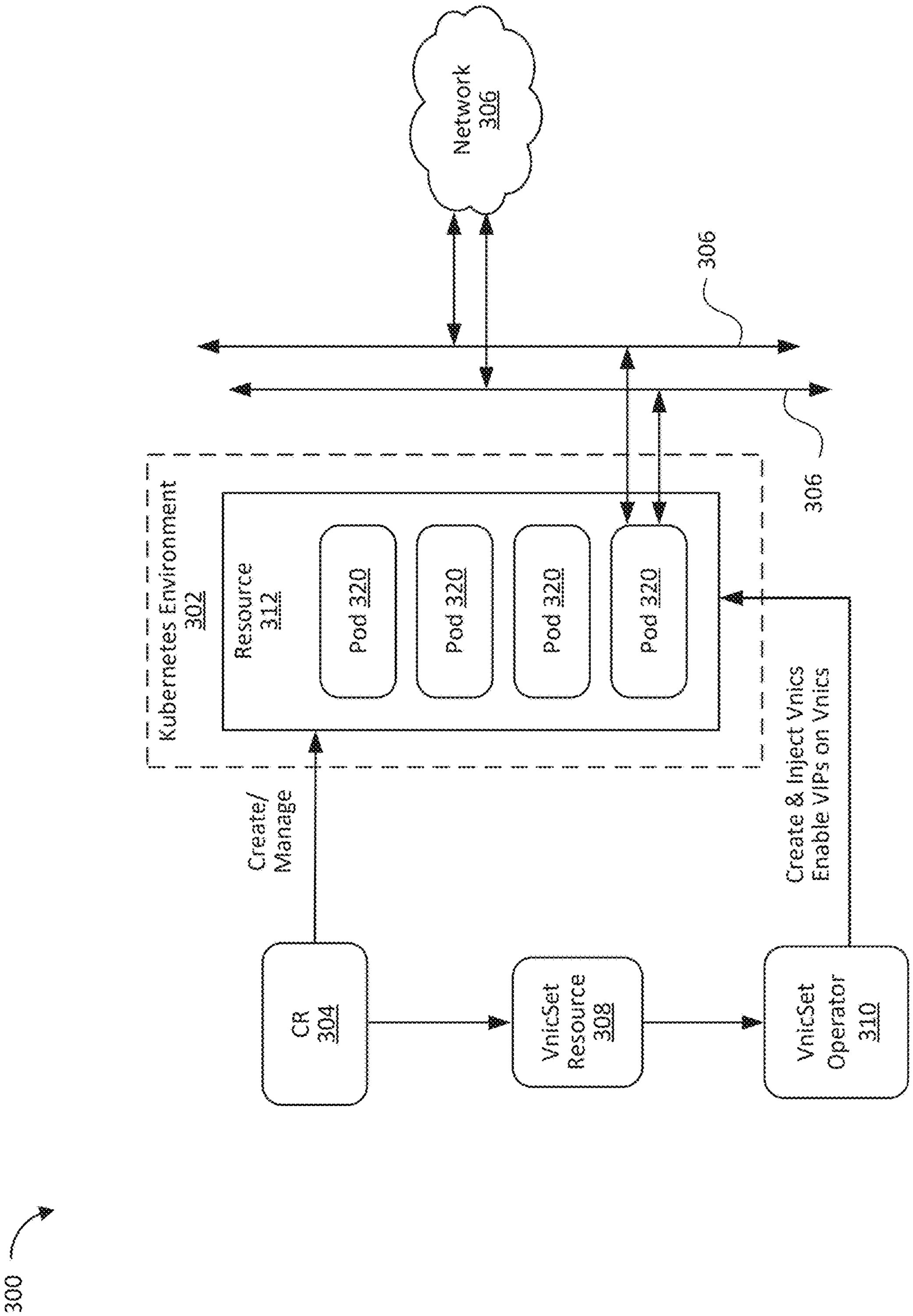
FIG. 3 illustrates an example system including a VnicSet operator, according to an embodiment herein.

Referring now to FIG. 3, an example system 300 including a VnicSet operator 310 for automating and controlling Vnics is illustrated, according to an embodiment herein. As shown, the system 300 includes a Kubernetes environment 302 containing resource 312. The resource 312 may manage the deployment and scaling of stateful or stateless applications. For example, the resource 312 may be a StatefulSet (for stateful applications) or may be Deployment (for stateless applications). The resource 312 may include pods 320 that are in communication with one or more external networks 306. As noted above, the external networks 306 may not be managed by Kubernetes through consistent ingress and egress paths. As such, interfaces may be created and injected to allow the pods 320 to be reachable via external networks 306 using predictable and fixed VIPs provided by Vnics 226.

Within Kubernetes, an operator may be a method of packaging, deploying, and managing an application within the Kubernetes environment 302. In an example, an operator may be an application-specific controller that extends the functionality of the Kubernetes API to create and manage applications for a user, thus may include application-specific information to automate the entire lifecycle of the software it manages. Operators may be customer Kubernetes controllers that use custom resources (CR), providing settings for values defined within a customer resource definition (CRD) file (which may refer to any form of resource definition data and not strictly to file system files), to manage applications and their components. The CRs may provide high-level configuration settings, which an operator may translate into low-level actions based on logic embedded within the operator. As such, an operator may watch a particular CR type and take application-specific actions to bring a current state of managed applications into alignment with a desired state specified in the resource. A custom operator may be invoked or initiated by an administrator or user providing a definition file for the operator and executing it at the Kubernetes control plane (E.g., via an apply command), causing the control plan to create and run the operator.

As shown, the system 300 includes a custom operator: a VnicSet operator 310. The VnicSet operator 310 may manage events associated with VnicSet resource 308. The VnicSet resource 308 objects may be a mechanism by which the VnicSet operator 310 assigns or injects the Vnics onto the pods 320 and enables VIPs on the Vnics for interfacing with the external network 306. The resource files for the pods 320 may include references to the corresponding VnicSet resources 308. The VnicSet resources 308 may be defined by the CR 304. For example, the CR 304 may define what Vnic resource requirements the created applications and associated pods 320 have. Based on the Vnic resource requirements, the VnicSet resource 308 yaml definition file may be created, indicating the required Vnic resources for the resource 312 and the pods 320.

Figure 4:
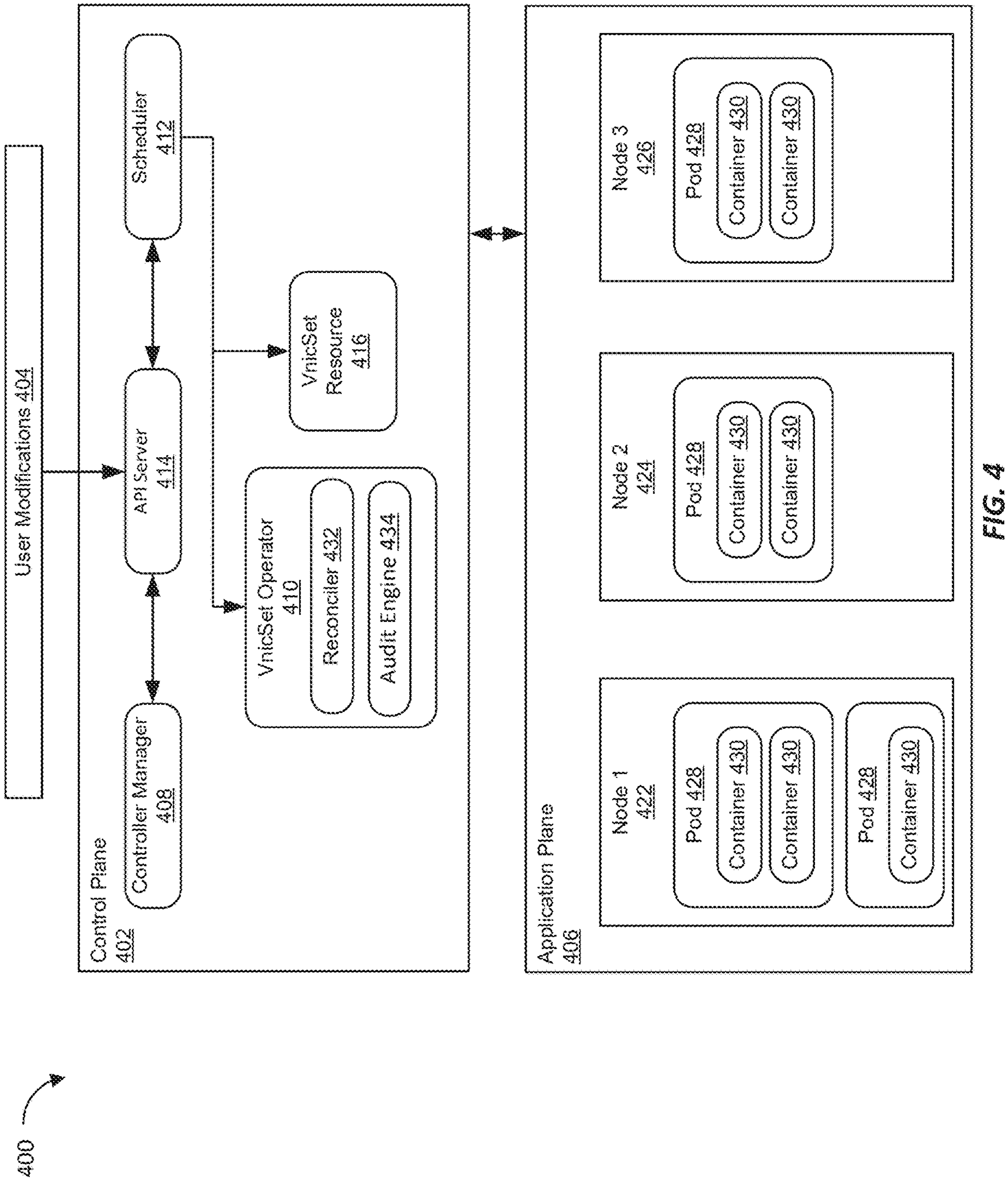
FIG. 4 illustrates an example system configured to implement cloud network service management, according to an embodiment herein.

Referring now to FIG. 4, FIG. 4 provides an example system 400 configured to implement cloud network service management, in accordance with certain embodiments of the present disclosure. In particular, the system 400 may depict an example Kubernetes architecture employing custom operators for monitoring and managing Vnics. The system 400 may include a control plane 402, which may receive user modifications 404 and implement those modifications and create and manage applications in an application plane 406. The control plane 402 may include a controller manager 408, an API server 414, a schedule 412, a VnicSet operator 410, a VnicSet resource 416. The application plane 406 may include a plurality of worker nodes or hosts, including node 1 422, node 2 424, and node 3 426. Each node 422-426 may include one or more pods 428, each of which may include one or more containers 430. Although depicted as part of control plane 402, elements such as VnicSet operator 410 may be executed on worker nodes 422-426, and may be configured to hook into the control plane 402 to extend the functioning of the control plane. System 400 may correspond to systems described in FIGS. 2-3.

As those skilled in the art readily appreciate, when Kubernetes is deployed, a cluster is provided that includes one or more worker machines called nodes 422-426. Each node 422-426 can host one or more pods 428, which may be the smallest deployable unit of computing that can be managed in Kubernetes. Each pod 428 can run one or more containers 430, which may be a bundle of software and all its dependencies (e.g., an application or microservice). Through nodes 422-426 and pods, Kubernetes can manage the resources needed to execute, expand, and manage applications or services in a cloud environment. These applications and resources may be managed via components running in the control plane 402.

The nodes 422-426 may be provisioned from a cloud provider external to Kubernetes, such as Openstack. To orchestrate the deployment and management of the nodes 422-426, the control plane 402 may be a container orchestration layer that exposes the API and interfaces to external networks. In part, the control plane 402 may define, deploy, and manage the lifecycle of containers 430, as well as the nodes 422-426 and pods 428 on which the containers 430 run. To manage the lifecycle of the containers 430, the control plane 402 may include various components, such as an API server 414, a controller manager 408, and a scheduler 412, each of which is described in turn below.

The API server 414 may provide a front end for the control plane 402, through which all other components may interact. The API server 414 may expose the Kubernetes API and receive user modifications 404 and other input. User modifications 404 may be received in the form of kubectl command line interface (CLI) instructions, which may include defining objects through yaml or json files. The API server 414 may validate and configure data for the API objects, including pods 428.

The controller manager 408 may run controller processes, where a controller may be a control loop that watches a shared state of the cluster through the API server 414 and makes changes to move the current state towards a desired state (which may be specified through user modifications 404, for example). The controller manager 408 may run controller processes for default Kubernetes controllers, as well as for controllers implemented by custom operators (e.g., VnicSet operator 410). Accordingly, the controller manager 408 may implement the management functions controlled by custom operators such as the VnicSet operator 410.

The scheduler 412 may watch for newly created pods 428 or other resources with no assigned node 422-426 and may select a node for the resources to run on. Decisions for which node 422-426 to assign a newly created pod 428 may be based on resource requirements and availability (e.g., based on workload distribution for the nodes), data locality, and other factors. Operators responsible for the creation of pods 428 may also influence or control which node 422-426 a pod is assigned to.

As described with respect to FIG. 3, a Kubernetes operator may be a method of packaging, deploying and managing an application in Kubernetes. An operator may implement a custom controller to manage applications according to values defined in custom resources (CR) (e.g., VnicSet resource 416). In some embodiments, operators (e.g., VnicSet operator 410) may run in the worker nodes 422-426. Because operators may implement controllers in the worker nodes 422-426, but controllers may run in the control plane 402, operators may effectively extend the control plane 402 into the worker nodes 422-426. An operator may add itself to the controller manager 408 list, thereby extending the list to the application plane 406, and may start monitoring the operator's resources via the API server 414.

An application pod 428 may be created as part of a resource, such as the resource 312. The scheduler 412 may decide which node 422-426 to assign the pod 428 based on resource availability. The controller manager 408 may be listening to the API server 414 for resources it is subscribed for. If the resource is modified, the change notification may trigger an event with the controller manager 408 which invokes the corresponding controller method for that resource to bring the resource back to the desired state from the current state.

When a custom operator (e.g., VnicSet operator 410) adds a hook to the controller manager 408, the controller manager will monitor the API server 414 for changes to a custom resource (e.g., VnicSet resource 416) associated with the custom operator, such as create, modify, or delete notifications. Any notification may indicate that a state of the custom resource has changed (e.g., changes to either the desired state or current state may result in a determination that the current state and desired state do not match), and triggers to the API server 414. Based on the notification, the controller manager 408 can execute a controller action onto the custom resource to bring the current state and the desired state of the application pod back into equilibrium. Essentially, an operator may add an endpoint to the Kubernetes API called a custom resource (CR), along with a control plane 402 component or hook that monitors and maintains resources of the new type. A custom operator may comprise a reconciler 432 module or process, which may direct the controller manager 408 on how to bring a custom resource from a current state to a desired state.

Accordingly, an operator may include the reconciler 432 as part of the controller method, which may continually loop to determine a state of an associated custom resource (e.g., the VnicSet operator 410, by way of the reconciler 432 and controller manager 408, may continually monitor the state of the VnicSet resource 416 through API server 414). Whenever a change event happens for the custom resource (e.g., based on user modifications 404), the operator may receive a notification. The operator may then adjust the state of the custom resource to bring it from the current state to the desired state. In case of any error or other failure to bring the custom resource to the desired state, the operator and reconciler 432 may continue in a loop to execute a particular set of operations until the custom resource reaches the desired state.

As described above, the pods 428 may contain one or more Vnics, such as the Vnics 226, which provide an interface through which an external source can interact and communicate with the pods 428. As such, the VnicSet operator 410 may create a Vnic for a respective pod 428 (or microservice) upon the pods 428 creation. As will be described in greater detail below, when the Vnic is created for a respective pod 428, the Vnic operator 410 may attach the Vnic to a respective node 422-426 and inject the Vnic into the pod 428.

Once a Vnic is created for injection, a VIP may be enabled and associated with the Vnic and pod according to the VnicSet resource CRD definition file. In some examples, all pods associated with a target application may have a Vnic with the same VIP. This VIP may be enabled only on active pods. Multiple Vnics with VIPs could be injected to provide multiple interface support for, e.g., network segregation. A same VIP can be associated with both active and standby pods to make the same interface available during pod switchover or failover events.

Currently, once a Vnic is created, attached, and injected into a pod 428, the VnicSet operator 310 does not monitor the Vnic further. This lack of supervision is resulting in non-active Vnics maintaining within the system 400. For example, if a Vnic is injected into the pod 428 on the node 422 and the pod 428 is subsequently decommissioned or deleted, the injected Vnic may maintain. In another example, which is expanded on in detail below with respect to FIG. 5, the VnicSet operator 410 may create a Vnic responsive to a VnicSet resource event (e.g., create, update, delete), but before the Vnic is attached and/or injected, the VnicSet operator 410 may crash or experience a failure resulting in a lost Vnic. The lost Vnic may be a Vnic that is created by the VnicSet operator 410 but is failed to be attached and/or injected into a respective pod of the environment 302 or system 400. Once the VnicSet operator 410 restarts, the VnicSet operator 410 may create a new Vnic based on the original event, resulting in two Vnics created for the same resource or event.

As those skilled in the art readily appreciate, non-active Vnics can lead to several negative consequences. For example, non-active Vnics not only results in wasted resources but also creates potential networking conflicts and inefficiencies. One such situation involves a Vnic being assigned to a port by the cloud provider (e.g., attached to the node 422) but failing to be used (e.g., not injected). With multiple instances of the Vnics assigned to the same pod, conflicts may occur, leading to communication errors and instability within the Kubernetes cluster. Additionally, redundant Vnics can introduce unnecessary complexity, making it challenging to troubleshoot and maintain the cluster's networking configuration. Furthermore, excessive allocation of ports without actual utilization can lead to port exhaustion, limiting the scalability and performance of the Kubernetes environment and/or cloud provider. Overall, the presence of non-active Vnics poses a significant risk to the reliability, efficiency, and scalability of Kubernetes deployments.

To monitor and rectify non-active Vnics, the VnicSet operator 410 may include an audit engine 434. The audit engine 434 may monitor Vnics as they are created and deployed (e.g., attached/injected). That is, the audit engine 434 may monitor the lifecycle of Vnics such to identify non-active Vnics. As will be described in greater detail below, once the audit engine 434 identifies a non-active Vnic, the audit engine 434 may rectify the Vnic. Rectification of a non-active Vnic may include utilizing the Vnic for its intended purposes (e.g., attaching or injecting it into a respective pod), thereby returning the Vnic to an active status. In another example, the audit engine 434 may decommission or delete a non-active Vnic. As can be appreciated, the rectification process may vary depending on the underlying event that caused the Vnic to become non-active, as well as the status of a respective pod 428. For example, if the respective pod 428 is deleted, then there is no need to activate the non-active Vnic created for deployment in the pod 428. As such, the audit engine 434 may delete the non-active Vnic.

Figure 5:
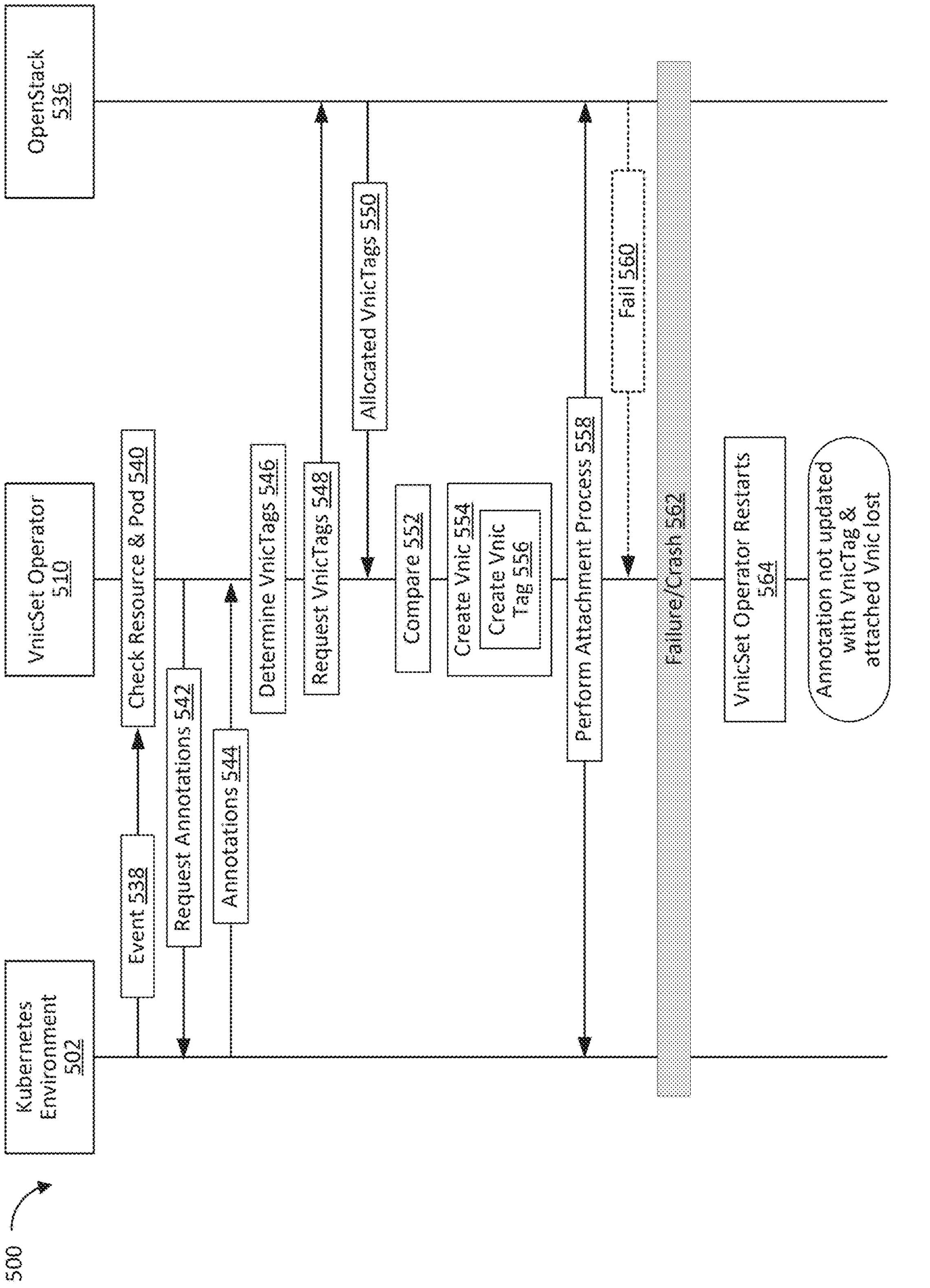
FIG. 5 illustrates an example operational flow in which a Vnic becomes non-active, according to an embodiment herein.

Referring now to FIG. 5, an example operational flow 500 in which a Vnic becomes non-active is illustrated, according to an embodiment herein. As shown, the operational flow 500 may initiate with an event 538. The event 538 may be a resource event such as a create, update, or delete event of a respective resource, such as the VnicSet resource 416. As noted above, a VnicSet operator 510 may receive notification of the event 538 or otherwise detect occurrence of the event 538. Responsive to the event 538, the VnicSet operator 510 may perform a check 540 of resources and/or pods associated with the event. For example, if the event 538 is an update request for a resource, then the VnicSet operator 510 may determine if there are any associated pods for the resource.

The VnicSet operator 510 may transmit a request 542 for annotations associated with the respective resource and/or application pods. That is, the request 542 may be for annotations of the resource/application pods associated with the respective event. Responsive to the request 542, the Kubernetes environment 502 may provide the requested annotations 544. As those skilled in the art readily appreciate, the annotations 544 may include metadata associated with the respective resource and/or application pods. For example, the annotations 544 may be key-value pairs used to attach arbitrary metadata to objects, such as the application pods. These annotations provide additional context and information about the pod, facilitating better management, monitoring, and automation tasks. In part, the annotations 544 can enable users to customize and extend Kubernetes functionality without modifying the core resources, enhancing flexibility and interoperability within the cluster ecosystem.

Once the VnicSet operator 510 receives the annotations 544, the VnicSet operator 510 may determine one or more VnicTags 546 from the annotations 544. That is, the annotations 544 may include information relating to Vnics that have been attached and injected into a respective application pod. Specifically, the annotations 544 may include VnicTags 546 of Vnics that have been deployed in application pods executing in the Kubernetes environment 502. As will be described in greater detail below, VnicTags 546 may include information of an associated application pod, such as a pod identifier (pod ID) of the first application pod, a pod name of the first application pod, and a namespace of the first application pod. As such, the VnicTags 546 determined from the annotations 544 may identify Vnics that have been deployed within the Kubernetes environment 502 as well as respective pods in which the Vnic is deployed.

Subsequently or in parallel to the VnicTags 546 being identified from the annotations 544, the VnicSet operator 510 may transmit a request 548 to a cloud computing platform, such as OpenStack 536, that provides infrastructure as a service (IaaS) for the Kubernetes environment 502. That is, in the illustrated flow 500, OpenStack 536 provisions virtual machines (VMs) to serve as Kubernetes nodes (e.g., nodes 422-426) within a respective cluster. While the remaining discussion focuses on private networks (e.g., via OpenStack), it should be appreciated the present disclosure is equally applicable to public cloud environments, such as using OCI (Oracle Cloud Infrastructure) or AWS (Amazon Web Services).

As noted above, OpenStack 536 provisions VMs to serve as nodes within the Kubernetes environment 502. As such, each VM provisioned by OpenStack 536 may be equipped with a Vnic to connect the VM to external networks, such as the OpenStack networking infrastructure. To equip each VM with a Vnic, a Vnic may be attached to a respective node. To attach the Vnic to a respective node, OpenStack 536 may first assign a port to a Vnic and associate a corresponding VnicTag with the port. Once allocated or assigned to a part, OpenStack 536 may attach the Vnic to a respective node. As such, responsive to the request 548, OpenStack 536 may provide a listing of allocated VnicTags 550. The allocated VnicTags 550 may indicate Vnics that have already been assigned to a port within OpenStack 536 and/or attached to a worker node within the Kubernetes environment 502.

Responsive to receiving the listing of the VnicTags 550, the VnicSet operator 510 may compare the allocated VnicTags 550 to the VnicTags 546. By comparing the allocated VnicTags 550 to the VnicTags 546, the VnicSet operator 510 can determine if a respective Vnic exists in OpenStack 536 and confirm whether a status of respective Vnics (e.g., attached/injected) matches the state information in the notations 544. For example, the VnicSet operator 510 may determine if there are any VnicTags that have been attached but not injected into the Kubernetes environment 502.

In the illustrated flow, the VnicSet operator 510 determines that there is no Vnic currently deployed or attached for the resource updated in the event 538. As such, the VnicSet operator 510 may create a new Vnic 554, as described above. Creation of the new Vnic 554 may also include generating a new VnicTag 556. Once the new Vnic 554 is created, the VnicSet operator 510 may perform an attachment process 558 of the new Vnic 554 to a respective node (e.g., node 422) within the Kubernetes environment 502. As part of the attachment process 558, the VnicSet operator 510 may request a port within OpenStack 536 be assigned to the new Vnic 554 and associated with the new VnicTag 556. If the attachment process 558 is successful, OpenStack 536 may not provide a notification. However, if the attachment process 558 is unsuccessful, Openstack 536 may transmit a fail notification 560.

In the illustrated flow 500, the attachment process 558 is successful and the new Vnic 554 is assigned a port within OpenStack 536 to attach the new Vnic 554 to a node within the Kubernetes environment 502. The next step to fully deploy the new Vnic 554 involves injecting the new Vnic 554 into a respective application pod. For example, to inject the new Vnic 554 into the respective application pod, the VnicSet operator 510 may change the namespace associated with the new Vnic 554 to the namespace of the respective pod in which the new Vnic 554 is deployed.

In the illustrated flow 500, however, before the new Vnic 554 can be injected into the respective application pod, there is a failure or crash 562. For example, the VnicSet operator 510 may crash, a Kubernetes node in which the VnicSet operator 510 is running crashes or rebuts, a user may upgrade the VnicSet operator 510, causing the VnicSet operator 510 to rebut, or there may be a disruption with a respective application pod running in the Kubernetes environment 502 (e.g., Kubernetes Cluster Overload causing a delay/failure to update the annotations). After the failure or crash 562, the VnicSet operator 510 may restart 564. At this point, the new Vnic 554 may be lost because it was not injected before the VnicSet operator 510 crashed. As such, the annotations 544 within the Kubernetes environment 502 may not be updated with the new VnicTag 556, meaning that the Kubernetes environment 502 is unaware of the new Vnic 554 which has already been attached and assigned a port in OpenStack 536.

As described above, currently systems and techniques do not monitor created Vnics 546 and as such, despite the new Vnic 554 being created and assigned to a port, the VnicSet operator 510 may restart and create a second new Vnic for the event 538. The new Vnic 455 may be considered a non-active Vnic because has not been fully deployed within the Kubernetes environment 502. As noted above, this example illustrates how non-active Vnics can result in wasted resources since two Vnics have been created based on the same event (e.g., for the same resource or application pod) and two ports have been assigned within OpenStack 536 for these Vnics. While this illustration only involves a single excess Vnic, it can be appreciated that when operation is to scale, hundreds if not thousands of non-active Vnics may exist at any given time. As such, identifying and rectifying non-active Vnics is important for reducing resource waste and reducing potential networking conflicts and inefficiencies.

Figure 6:
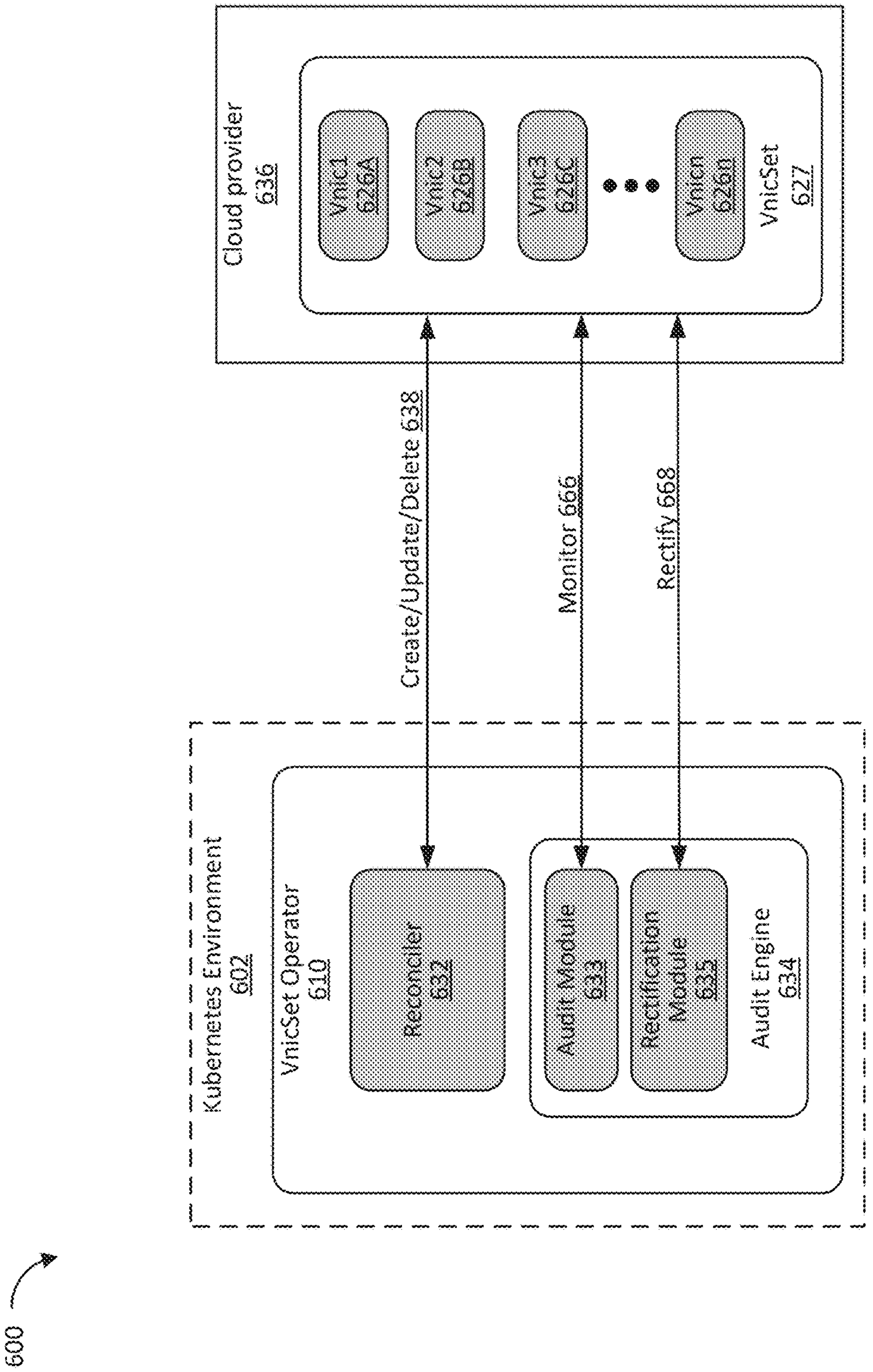
FIG. 6 illustrates an operational environment including a VnicSet operator containing an audit engine, according to an embodiment herein.

Referring now to FIG. 6, an operational environment 600 including a VnicSet operator 610 containing an audit engine 634 is provided, according to an embodiment herein. As noted above, to monitor and rectify non-active Vnics, the VnicSet operator 610 may include an audit engine 634. The audit engine 634 may be part of the VnicSet operator 610 and function similar to a reconciler 632, as described above. That is, the audit engine 634, like the reconciler 632 may be part of the control plane 402 of the Kubernetes environment 302 once the VnicSet operator 610 is deployed into the Kubernetes environment 602.

As described above, a cloud provider 636, such as OpenStack 536, may provision resources (e.g., VMs) on which application pods or microservices are served within the Kubernetes environment 602. As such, the VnicSet operator 610 may interact with the cloud provider 636 for resource management based on events 638 which may include create, update, or deletion events. Since a Vnic 626 may be deployed for each respective application pod or microservice as it is provisioned by the cloud provider 636, there may be multiple Vnics 626A-n executing via the cloud provider 636. In the illustrated example, there is a VnicSet 627 containing Vnics 626A-n executing on VMs provisioned by the cloud provider 636. The VnicSet 627 may correspond to the VnicSet resource 416 that is managed by the VnicSet operator 610, as described above. Accordingly, as the changes are made with respect to the VnicSet resource 416, the VnicSet 627 may also undergo changes, such as requiring additional Vnics 626A-n or removal of Vnics 626A-n, depending on the effect of the changes to the application pods executing in the Kubernetes environment 602.

Once the Vnics 626A-n are created, the audit engine 634 may monitor 666 the Vnics 626A-n. In particular, an audit module 633 of the audit engine may monitor a status of each Vnic 626A-n. For example, the audit module 633 may periodically request annotations, such as the annotations 544, from the Kubernetes environment 602 to determine Vnics 626A-n that have been deployed. Request for the annotations may be made on a periodic basis (e.g., once a day, every week) or may be done responsive to an event 638, as described above with respect to FIG. 5. From the annotations, the audit module 633 may determine VnicTags associated with resources managed by application pods of the Kubernetes environment 602. Using the VnicTags, the audit module 633 may determine the status of each Vnic. For example, the audit module 633 may determine a resource or pod associated with the Vnic 626B of a given VnicTag is no longer active or existing. As such, the audit module 633 may determine that the Vnic 626B is no longer active (e.g., not being used by an active resource/application pod). In other scenarios, the audit module 633 may determine that none of Vnics 626A-n corresponds to a resource or application pod associated with the event 638. As such, the audit engine 634 may determine that a new Vnic is required based on the event 638. Monitoring 666 of the Vnics 626A-n will be described in greater detail below with respect to FIGS. 7-8.

Once a non-active Vnic is identified or that a new Vnic is required, the audit engine 634 may perform a rectification process 668. In particular, the audit engine 634 may include a rectification module 635 that performs the rectification process 668. As will be described in greater detail below with respect to FIGS. 7-8, the rectification process 668 varies depending on the non-active status of the Vnic 626A-n, the status of an underlying resource or application pod, and the requirements to remedy the issue. Following the above examples, since the Vnic 626B is associated with a non-active or non-existing application pod or resource, rectification module 635 may request deletion of the Vnic 626B, including deletion of the port assignment to the Vnic 626B by the cloud provider 636. In the other example, since a new Vnic is required based on the event 638, the rectification module 635 may create a new Vnic, along with a respective VnicTag for attachment and injection into a respective application pod.

Figure 7:
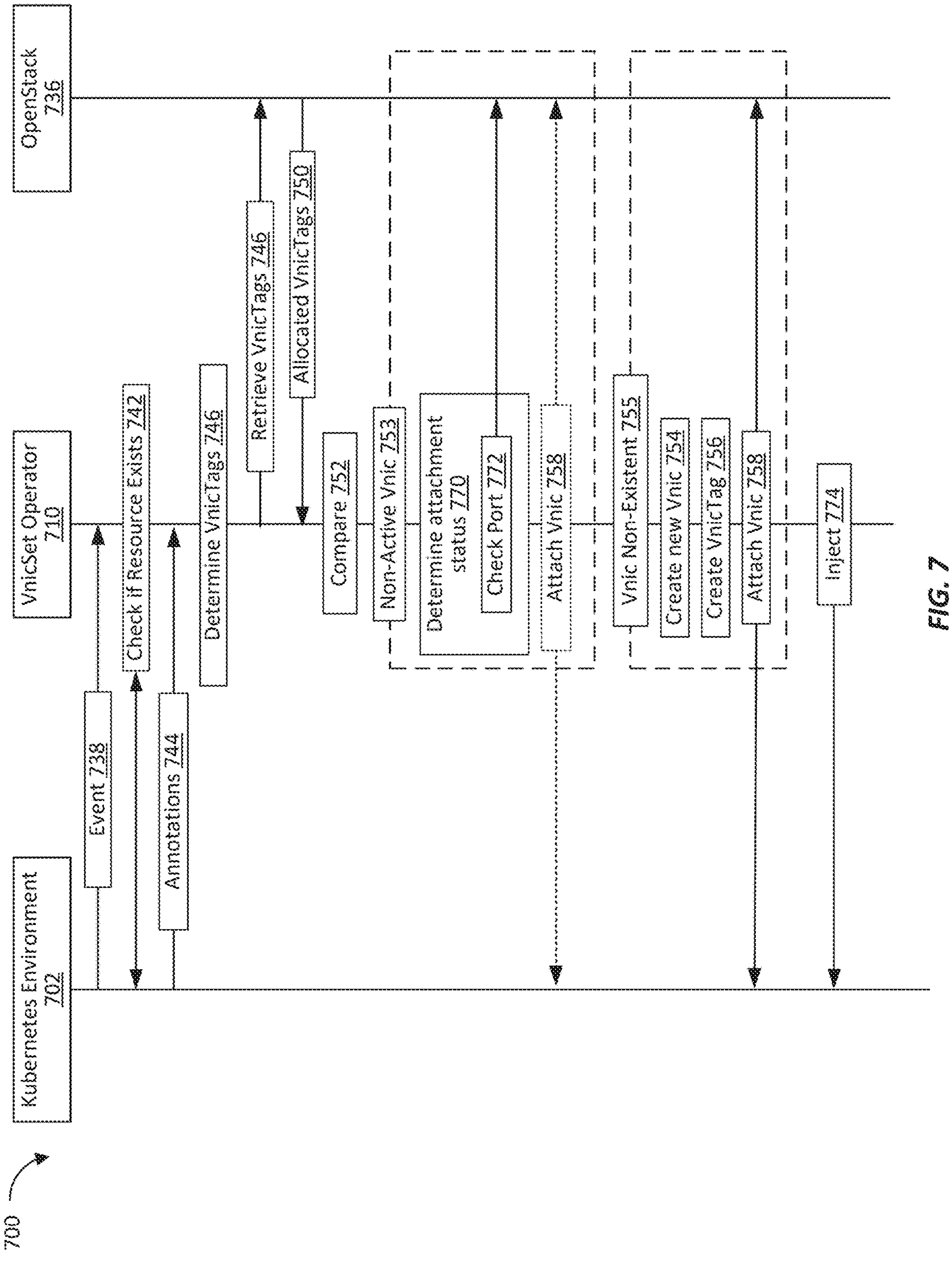
FIG. 7 illustrates an example operational flow illustrating one or more functions of a VnicSet operator, according to an embodiment herein.

Referring now to FIG. 7, an example operational flow 700 illustrating one or more functions of a VnicSet operator 710 is provided, according to an embodiment herein. The illustrated flow may exemplify a process after a restart of the VnicSet operator 710 or monitoring 666 performed by the audit engine 634 on a periodic basis or responsive to an event, such as the event 738. As shown, an event 738 may occur within the Kubernetes environment 702, such as a create, update, or delete event for resources or application pods. Based on the event 738, the VnicSet operator 710, in particular an audit engine 634 within the VnicSet operator 710, may check if a respective resource exists 742. This may include requesting annotations 744 from the Kubernetes environment 702.

From the annotations 714, the VnicSet operator 710 may determine one or more VnicTags 746 associated with Vnics deployed within the Kubernetes environment 702. In parallel to the check 742 or subsequent to, the VnicSet operator 710 may retrieve 746 VnicTags for allocated or attached VnicTags from a cloud computing platform provision VMs for the respective resource or application pod. Here, the cloud computing platform is OpenStack 736. Responsive to the request, OpenStack 736 may provide allocated VnicTags 750 to the VnicSet operator 710. The VnicSet operator 710 may perform a comparison 752 of the allocated VnicTags 750 to the VnicTags 746. From the comparison, the VnicSet operator 710 may determine non-active Vnics, such as Vnics that have not been attached or injected. Additionally, the VnicSet operator 710 may determine whether new VnicTags need to be created, such as if no VnicTags exist for a corresponding resource or application pod.

If the VnicTag is found in the allocated VnicTags 750 but not within the VnicTags 746 from the annotations 744, then the VnicSet operator 710 may determine these tags to be non-active tags. That is, the VnicTags 750 have been allocated, but are not active within the Kubernetes environment 702. As such, the VnicSet operator may continue to rectify the non-active Vnic 753, following the steps of flow 700 within the non-active Vnic 753 area. However, if the VnicSet operator 710 determines that a Vnic is non-existent 755, then the VnicSet operator 710 may continue to rectify the non-existent Vnic 755 following the steps of flow 700 within the Vnic non-existent 755 area. Each is described in turn below.

For non-active Vnics 753, the VnicSet operator 710 may determine an attachment status 770 of the non-active Vnic. For example, the VnicSet operator 710 may check the port 772 assigned to the non-active Vnic. This may include querying OpenStack 736 to verify that the port assigned to the non-active Vnic has been attached to a respective worker node within the Kubernetes environment 702 or may include requesting a port assigned to the non-active Vnic. If no port is assigned to the non-active Vnic or it is determined that the non-active Vnic has not been attached to a worker node, the VnicSet operator 710 may perform an attachment process 758 for the non-active Vnic. As described above, the attachment process 758 may include assigning a port and attaching the port to a worker node within the Kubernetes environment 702. As part of the attachment process 758, the VnicTag for the non-active Vnic may be associated with the port and/or worker node. If the VnicSet operator 710 determines that the non-active Vnic is already attached or after the attachment process 758 is performed, the flow 700 may continue to injecting 774 the non-active Vnic. As part of the injection process, the VnicTag associated with the non-active Vnic may be incorporated into the annotations 744 of a respective application pod.

If the Vnic is not found and thus is non-existent 755, then the VnicSet operator 710 may create a new Vnic 754 and create a corresponding new VnicTag 756. To create a new VnicTag 756, the VnicSet operator may generate the VnicTag to include a pod identifier (pod ID) of a respective application pod, a pod name of the respective application pod, and a namespace of the respective application pod. Once the new Vnic 756 is created, the VnicSet operator 710 may perform the attachment process 758 and then inject 774 the new Vnic 754 into the Kubernetes environment 702.

Figure 8:
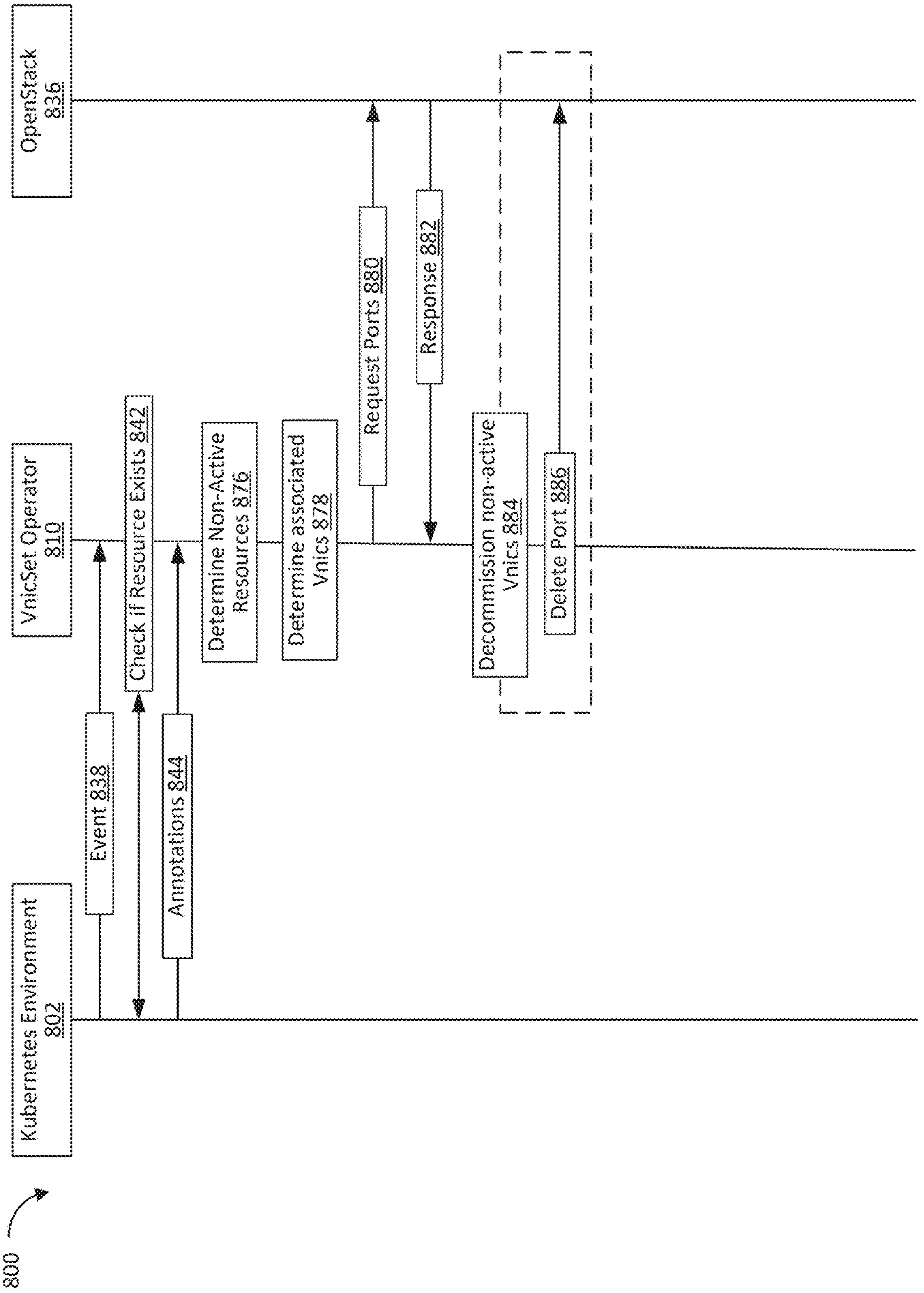
FIG. 8 illustrates an example operational flow showing rectification of a non-active Vnic, according to an embodiment herein.

Referring now to FIG. 8, another example operational flow 800 is illustrated showing rectification of a non-active Vnic, according to an embodiment herein. As described above, a scenario in which lost Vnics or non-active Vnics often crop up is when an underlying resource or application pod is non-active (e.g., deleted or decommissioned) but the Vnic maintains within both the Kubernetes environment 702 and within OpenStack 736. To identify and rectify these types of non-active Vnics, a VnicSet operator 810 may identify non-active Vnics and rectify them, such as by decommission or deleting them.

As illustrated, the VnicSet operator 810 may identify or otherwise be notified of an event 838. In the illustrated flow 700, the event 838 may be a delete event of one or more application pods. As such, the VnicSet operator 810, in particular the audit module 633 of the audit engine 634, may check if the underlying resource or application pods exists 842. This may include requesting annotations 844 from the Kubernetes environment 8002. Based on the annotations 844, the VnicSet operator 810 (e.g., the audit module 633) may determine a status for each respective resource or otherwise determine which of the resources are non-active resources 876. For each of the non-active resources 876, the VnicSet operator 810 may determine Vnics 878 associated with the non-active resources 876. These Vnics 878 may be considered non-active Vnics because they are associated with non-active resources and/or application pods.

Once the non-active Vnics 878 are identified, the VnicSet operator 810 may perform a rectification process. In particular, the rectification module 635 of the audit engine 634 may perform the rectification process 668. As part of the rectification process 668, the VnicSet operator 810 may request ports 880 assigned to the non-active Vnics 878 from OpenStack 836. OpenStack 836 may provide those port assignments via a response 882. Using the port assignments, the VnicSet operator 810 may decommission 884 the non-active Vnics 878. For example, this may include transmitting a request to delete respective ports 886 to OpenStack 836. Once the ports 886 are deleted, non-active Vnics 878 may also be deleted.

Figure 9:
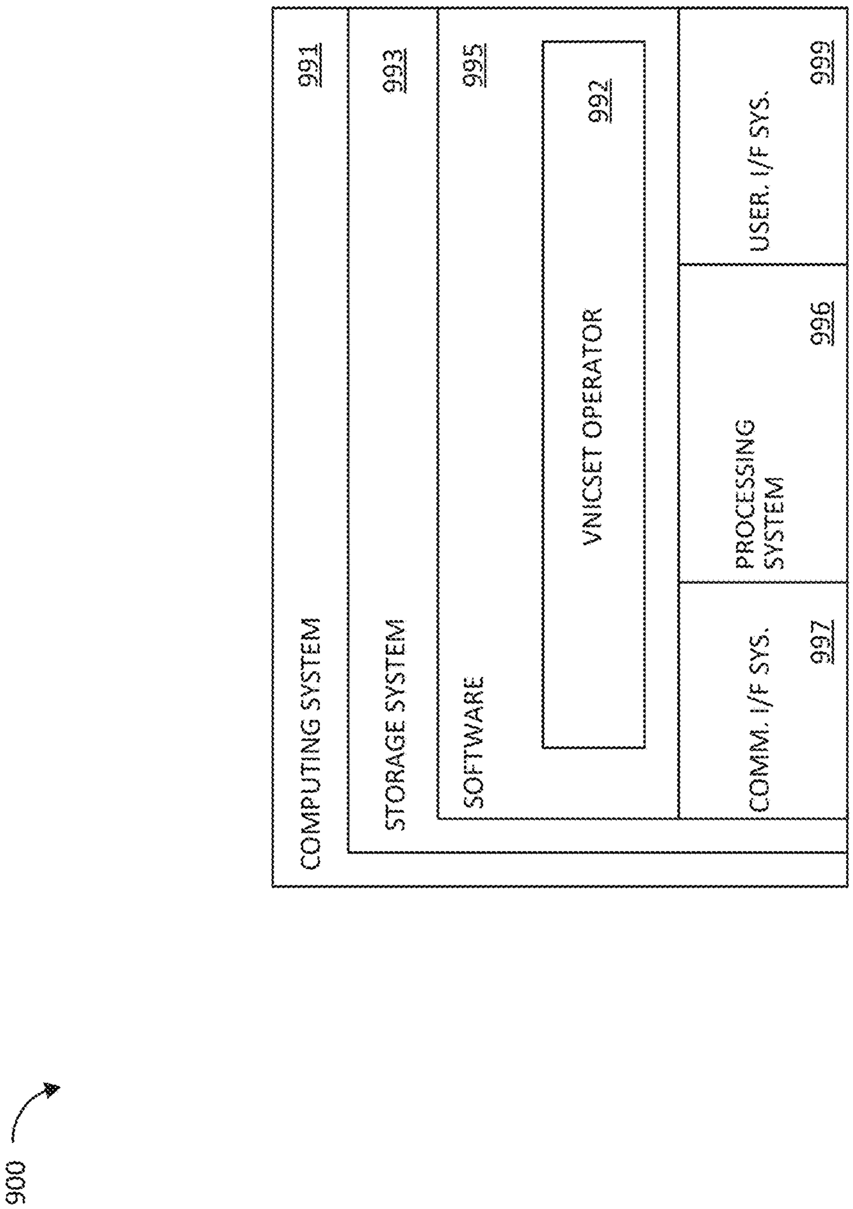
FIG. 9 shows an example computing device suitable for providing a VnicSet operator containing an audit engine and its related functions, according to an embodiment herein.

Referring now to FIG. 9, a diagram of a system 900 configured to implement an Vnic auditing engine is provided, according to an embodiment herein. The system 900 may be an example of an apparatus including a computing apparatus 991 that is representative of any system or collection of systems in which the various processes, systems, programs, services, and scenarios disclosed herein may be implemented. For example, computing apparatus 991 may be an example VnicSet operator, such as the VnicSet operator 210, 410, 510, 610, 710 or 810, an example of an audit engine, such as the audit engine 434 or 634, or any of the subcomponents depicted in system 200 of FIG. 2. Examples of computing apparatus 991 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 991 may be implemented as a single apparatus, system, or device or may be implemented in a distributed manner as multiple apparatuses, systems, or devices. Computing apparatus 991 may include, but is not limited to, processing system 996, storage system 993, software 995, communication interface system 997, and user interface system 999. Processing system 996 may be operatively coupled with storage system 993, communication interface system 997, and user interface system 999.

Processing system 996 may load and execute software 995 from storage system 993. Software 995 may include a VnicSet operator 992, which may be representative of any of the operations for providing a VnicSet operator or any of its related functions, as discussed with respect to the preceding figures. When executed by processing system 996, software 995 may direct processing system 996 to operate as described herein for at least the various processes, such as the flows 700 or 800, operational scenarios, and sequences discussed in the foregoing implementations. Computing apparatus 991 may optionally include additional devices, features, or functionality not discussed for purposes of brevity.

In some embodiments, processing system 996 may comprise a micro-processor and other circuitry that retrieves and executes software 995 from storage system 993. Processing system 996 may be implemented within a single processing device but may also be distributed across multiple processing devices or sub-systems that cooperate in executing program instructions. Examples of processing system 996 may include general purpose central processing units, graphical processing units, application specific processors, and logic devices, as well as any other type of processing device, combinations, or variations thereof.

Storage system 993 may comprise any memory device or computer-readable storage medium readable by processing system 996 and capable of storing software 995. Storage system 993 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 993 may also include computer readable communication media over which at least some of software 995 may be communicated internally or externally. Storage system 993 may be implemented as a single storage device but may also be implemented across multiple storage devices or sub-systems co-located or distributed relative to each other. Storage system 993 may comprise additional elements, such as a controller, capable of communicating with processing system 996 or possibly other systems.

Software 995 (including the VnicSet operator 992 among other functions) may be implemented in program instructions that may, when executed by processing system 996, direct processing system 996 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 995 may include additional processes, programs, or components, such as operating system software, virtualization software, or other application software. Software 995 may also comprise firmware or some other form of machine-readable processing instructions executable by processing system 996.

In general, software 995 may, when loaded into processing system 996 and executed, transform a suitable apparatus, system, or device (of which computing apparatus 991 is representative) overall from a general-purpose computing system into a special-purpose computing system as described herein. Indeed, encoding software 995 on storage system 993 may transform the physical structure of storage system 993. The specific transformation of the physical structure may depend on various factors in different implementations of this description. Examples of such factors may include, but are not limited to, the technology used to implement the storage media of storage system 993 and whether the computer-storage media are characterized as primary or secondary storage, as well as other factors.

For example, if the computer-readable storage medium is implemented as semiconductor-based memory, software 995 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 997 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 991 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing an VnicSet operator containing an auditing engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a VnicSet operator system, comprising: one or more processors; a memory having stored thereon instructions that, upon execution by the one or more processors, cause the one or more processors to implement a process to manage a virtual network interface controller (Vnic) on an application pod of a containerized software environment, the Vnic being directly reachable from a network external to the containerized software environment, the process including: monitor a plurality of Vnics created for deployment within the containerized software environment, wherein each of the plurality of Vnics is associated with a respective application pod within the containerized software environment; determine one or more non-active Vnics within the plurality of Vnics; and rectify the one or more non-active Vnics.

Example 2 is the VnicSet operator system of any previous or subsequent Example, wherein the instructions to rectify the one or more non-active Vnics, upon execution, further cause the one or more processors to: attach a first Vnic of the one or more non-active Vnics to a node associated with a respective application pod of the containerized software environment; and inject the first Vnic into the respective application pod, wherein injecting the first Vnic into the respective application pod comprises updating a namespace associated with the first Vnic to the namespace of the respective application pod.

Example 3 is the VnicSet operator system of any previous or subsequent Example, wherein: the instructions to determine one or more non-active Vnics within the plurality of Vnics, upon execution, further cause the one or more processors to: determine a first application pod comprising a non-active status; and determine a first Vnic associated with the first application pod, wherein the one or more non-active Vnics comprise the first Vnic; and the instructions to rectify the one or more non-active Vnics, upon execution, further cause the one or more processors to decommission the first Vnic based on the non-active status of the first application pod.

Example 4 is the VnicSet operator system of any previous or subsequent Example, wherein: the instructions to monitor the plurality of Vnics created for deployment within the containerized software environment, upon execution, further cause the one or more processors to: determine annotations associated with respective resources managed by the one or more application pods of the containerized software environment; determine a plurality of VnicTags based on the annotations, wherein each of the plurality of VnicTags is associated with a respective Vnic of the plurality of Vnics; and determine a plurality of allocated VnicTags; and the instructions to determine one or more non-active Vnics within the plurality of Vnics, upon execution, further cause the one or more processors to compare the plurality of allocated VnicTags to the plurality of VnicTags to determine the one or more non-active Vnics of the plurality of Vnics.

Example 5 is the VnicSet operator system of any previous or subsequent Example, further comprising instructions that, upon execution, further cause the one or more processors to: determine, based on the plurality of Vnics created for deployment within the containerized software environment, that a first Vnic for a first resource managed by a first application pod is needed; create the first Vnic for the first resource managed by the first application pod of the containerized software environment; and generate a first VnicTag for the first Vnic, wherein the first VnicTag comprises: a pod identifier (pod ID) of the first application pod; a pod name of the first application pod; and a namespace of the first application pod.

Example 6 is the VnicSet operator system of any previous or subsequent Example, further comprising instructions that, upon execution, cause the one or more processors to: generate a VnicTag for each of the plurality of Vnics, wherein the VnicTag comprises: a pod identifier (pod ID) of the application pod associated with a respective Vnic; a pod name of the application pod associated with a respective Vnic; and a namespace where the application pod associated with a respective Vnic is running.

Example 7 is the VnicSet operator system of any previous or subsequent Example, wherein the instructions to rectify the one or more non-active Vnics, upon execution, further cause the one or more processors to: inject first Vnic into the respective application pod, wherein injecting the first Vnic into the respective application pod comprises updating a namespace associated with the first Vnic to the namespace of the respective application pod.

Example 8 is a method for managing a virtual network interface controller (Vnic) created for deployment on an application pod of a containerized software environment, the Vnic being directly reachable from a network external to the containerized software environment, the method comprising: monitoring, by an audit engine of a Vnic operator, a plurality of Vnics created for deployment within the containerized software environment such that each of the plurality of Vnics is associated with a respective resource managed by one or more application pods of the containerized software environment; determining, by the audit engine, one or more non-active Vnics of the plurality of Vnics; and rectifying, by the audit engine, the one or more non-active Vnics from the plurality of Vnics.

Example 9 is the method of any previous or subsequent Example, wherein monitoring, by the audit engine, the plurality of Vnics comprises: determining, by the audit engine, annotations associated with respective resources managed by the one or more application pods of the containerized software environment; extracting, by the audit engine, a plurality of VnicTags from the annotations, wherein each of the plurality of VnicTags is associated with a respective Vnic of the plurality of Vnics; receiving, by the audit engine, a listing of allocated VnicTags from a cloud provider, wherein the cloud provider manages resources for the one or more application pods of the containerized software environment, wherein the listing of allocated VnicTags comprises a plurality of allocated VnicTags; and comparing, by the audit engine, the plurality of allocated VnicTags to the plurality of VnicTags to determine an active status for each of the VnicTags in the plurality of VnicTags.

Example 10 is the method of any previous or subsequent Example, wherein rectifying, by the audit engine, comprises: attaching, by the Vnic operator, a first Vnic of the one or more non-active Vnics to a node associated a respective application pod of the containerized software environment; and injecting, by the Vnic operator, the first Vnic into the respective application pod within the containerized software environment.

Example 11 is the method of any previous or subsequent Example, wherein rectifying, by the audit engine, comprises: decommissioning, by the audit engine, a first Vnic of the one or more non-active Vnics, wherein decommissioning the first Vnic comprises requesting deletion of a port assigned to the first Vnic.

Example 12 is the method of any previous or subsequent Example, wherein the method further comprises: creating, by the Vnic operator, a first Vnic for a first resource managed by a first application pod of the containerized software environment; creating, by the Vnic operator, a first VnicTag for the first Vnic; attaching, by the Vnic operator, the first Vnic to a node associated a respective application pod of the containerized software environment; and injecting, by the Vnic operator, the first Vnic into the first application pod within the containerized software environment.

Example 13 is the method of any previous or subsequent Example, wherein the method further comprises: generating, by the Vnic operator, a VnicTag for each of the plurality of Vnics, wherein the VnicTag comprises: a pod identifier (pod ID) of an application pod associated with a respective Vnic; a pod name of the application pod associated with the respective Vnic; and a namespace of the application pod associated with the respective Vnic.

Example 14 is the method of any previous or subsequent Example, wherein the containerized software environment comprises a Kubernetes cluster.

Example 15 is the method of any previous or subsequent Example, wherein monitoring, by the audit engine of the Vnic operator, the plurality of Vnics created for deployment within the containerized software environment such that each of the plurality of Vnics is associated with a respective resource managed by the one or more application pods of the containerized software environment comprises: determining, by the audit engine, an event within the containerized software environment; requesting, by the audit engine, annotations associated with resources managed by the one or more application pods of the containerized software environment; and determining, by the audit engine, a status of each Vnic of the plurality of Vnics based on the annotations.

Example 16 is a computer-readable storage medium comprising processor-executable instructions, wherein the processor-executable instructions comprise a virtual network interface controller (Vnic) operator that manages a plurality of Vnics created for deployment on an application pod of a containerized software environment, each of the plurality of Vnics being directly reachable from a network external to the containerized software environment, wherein the Vnic operator is configured to cause one or more processors to: monitor a plurality of Vnics created for deployment within the containerized software environment, wherein each of the plurality of Vnics is associated with a respective application pod within the containerized software environment; determine one or more non-active Vnics within the plurality of Vnics; and rectify the one or more non-active Vnics.

Example 17 is the computer-readable storage medium of any previous or subsequent Example, wherein: the processor-executable instructions of the Vnic operator to monitor the plurality of Vnics created for deployment within the containerized software environment cause the one or more processors to further execute processor-executable instructions stored in the computer-readable storage medium to: receive, from the containerized software environment, annotations associated with respective resources managed by the one or more application pods of the containerized software environment; determine a plurality of VnicTags based on the annotations, wherein each of the plurality of VnicTags is associated with a respective Vnic of the plurality of Vnics; and receive, from a cloud provider, a plurality of allocated VnicTags, wherein the cloud provider manages resources for the one or more application pods of the containerized software environment; and the processor-executable instructions of the Vnic operator to determine the one or more non-active Vnics within the plurality of Vnics cause the one or more processors to further execute processor-executable instructions stored in the computer-readable storage medium to compare the plurality of allocated VnicTags to the plurality of VnicTags to determine the one or more non-active Vnics of the plurality of Vnics.

Example 18 is the computer-readable storage medium of any previous or subsequent Example, wherein: the processor-executable instructions of the Vnic operator to determine the one or more non-active Vnics within the plurality of Vnics cause the one or more processors to further execute processor-executable instructions stored in the computer-readable storage medium to: determine that a first application pod is deleted; and determine a first Vnic associated with the first application pod, wherein the one or more non-active Vnics comprise the first Vnic; and the processor-executable instructions of the Vnic operator to rectify the one or more non-active Vnics within the plurality of Vnics cause the one or more processors to further execute processor-executable instructions stored in the computer-readable storage medium to request deletion of a port assigned to the first Vnic based on the first application pod being deleted.

Example 19 is the computer-readable storage medium of any previous or subsequent Example, wherein the processor-executable instructions cause the one or more processors to further execute processor-executable instructions stored in the computer-readable storage medium to: determine, based on the plurality of Vnics created for deployment within the containerized software environment, that a first Vnic for a first resource managed by a first application pod is needed; create the first Vnic for the first resource managed by the first application pod of the containerized software environment; and generate a first VnicTag for the first Vnic; attach the first Vnic to a node associated the first application pod; and inject the first Vnic into the first application pod within the containerized software environment, wherein the first VnicTag comprises: a pod identifier (pod ID) of the first application pod; a pod name of the first application pod; and a namespace of the first application pod.

Example 20 is the computer-readable storage medium of any previous or subsequent Example, wherein: the processor-executable instructions of the Vnic operator to determine the one or more non-active Vnics within the plurality of Vnics cause the one or more processors to further execute processor-executable instructions stored in the computer-readable storage medium to determine a first Vnic comprising a non-attachment status, wherein the one or more non-active Vnics comprise the first Vnic; and the processor-executable instructions of the Vnic operator to rectify the one or more non-active Vnics within the plurality of Vnics cause the one or more processors to further execute processor-executable instructions stored in the computer-readable storage medium to: attach the first Vnic to a node associated with a first application pod of the one or more application pods based on the non-attachment status of the first Vnic; and inject the first Vnic into the first application pod, wherein injecting the first Vnic into the first application pod comprises updating a namespace associated with the first Vnic to the namespace of the first application pod.

What is claimed is:

1. A VnicSet operator system, comprising:

one or more processors;

a memory having stored thereon instructions that, upon execution by the one or more processors, cause the one or more processors to implement a process to manage a virtual network interface controller (Vnic) on an application pod of a containerized software environment, the Vnic being directly reachable from a network external to the containerized software environment, the process including:

monitor a plurality of Vnics created for deployment within the containerized software environment, wherein each of the plurality of Vnics is associated with a respective application pod within the containerized software environment;

determine one or more non-active Vnics within the plurality of Vnics, wherein a non-active Vnic: is a Vnic identified based on a comparison between a plurality of VnicTags associated with the plurality of Vnics and a plurality of allocated VnicTags corresponding to Vnics allocated within the containerized software environment and includes a Vnic that has been allocated but not attached to a node or injected into an application pod; and rectify the one or more non-active Vnics by performing at least one of:

decommissioning the one or more non-active Vnics; or activating the one or more non-active Vnics for use within the containerized software environment.

2. The VnicSet operator system of claim 1, wherein the instructions to rectify the one or more non-active Vnics, upon execution, further cause the one or more processors to:

attach a first Vnic of the one or more non-active Vnics to a node associated with a respective application pod of the containerized software environment; and inject the first Vnic into the respective application pod, wherein injecting the first Vnic into the respective application pod comprises updating a namespace associated with the first Vnic to the namespace of the respective application pod.

3. The VnicSet operator system of claim 1, wherein:

the instructions to determine one or more non-active Vnics within the plurality of Vnics, upon execution, further cause the one or more processors to:

determine a first application pod comprising a non-active status; and determine a first Vnic associated with the first application pod, wherein the one or more non-active Vnics comprise the first Vnic; and the instructions to rectify the one or more non-active Vnics, upon execution, further cause the one or more processors to decommission the first Vnic based on the non-active status of the first application pod.

4. The VnicSet operator system of claim 1, wherein the instructions to monitor the plurality of Vnics created for deployment within the containerized software environment, upon execution, further cause the one or more processors to:

determine annotations associated with respective resources managed by the one or more application pods of the containerized software environment;

determine the plurality of VnicTags based on the annotations, wherein each of the plurality of VnicTags is associated with a respective Vnic of the plurality of Vnics; and determine the plurality of allocated VnicTags corresponding to Vnics allocated within the containerized software environment, wherein the comparison between the plurality of allocated VnicTags and the plurality of VnicTags is based on the determined annotations.

5. The VnicSet operator system of claim 1, further comprising instructions that, upon execution, further cause the one or more processors to:

determine, based on the plurality of Vnics created for deployment within the containerized software environment, that a first Vnic for a first resource managed by a first application pod is needed;

create the first Vnic for the first resource managed by the first application pod of the containerized software environment; and generate a first VnicTag for the first Vnic, wherein the first VnicTag comprises:
a pod identifier (pod ID) of the first application pod;
a pod name of the first application pod; and
a namespace of the first application pod.

6. The VnicSet operator system of claim 1, further comprising instructions that, upon execution, cause the one or more processors to:
generate a VnicTag for each of the plurality of Vnics, wherein the VnicTag comprises:
a pod identifier (pod ID) of the application pod associated with a respective Vnic;
a pod name of the application pod associated with a respective Vnic; and
a namespace where the application pod associated with a respective Vnic is running.

7. The VnicSet operator system of claim 1, wherein the instructions to rectify the one or more non-active Vnics, upon execution, further cause the one or more processors to:
inject a first Vnic into the respective application pod, wherein injecting the first Vnic into the respective application pod comprises updating a namespace associated with the first Vnic to the namespace of the respective application pod.

8. A method for managing a virtual network interface controller (Vnic) created for deployment on an application pod of a containerized software environment, the Vnic being directly reachable from a network external to the containerized software environment, the method comprising:
monitoring, by an audit engine of a Vnic operator, a plurality of Vnics created for deployment within the containerized software environment such that each of the plurality of Vnics is associated with a respective resource managed by one or more application pods of the containerized software environment;
determining, by the audit engine, one or more non-active Vnics of the plurality of Vnics, wherein a non-active Vnic: is a Vnic identified based on a comparison between a plurality of VnicTags associated with the plurality of Vnics and a plurality of allocated VnicTags corresponding to Vnics allocated within the containerized software environment and includes a Vnic that has been allocated but not attached to a node or injected into an application pod; and
rectifying, by the audit engine, the one or more non-active Vnics from the plurality of Vnics by performing at least one of:
decommissioning the one or more non-active Vnics; or
activating the one or more non-active Vnics for use within the containerized software environment.

9. The method of claim 8, wherein monitoring, by the audit engine, the plurality of Vnics comprises:
determining, by the audit engine, annotations associated with respective resources managed by the one or more application pods of the containerized software environment;
extracting, by the audit engine, a plurality of VnicTags from the annotations, wherein each of the plurality of VnicTags is associated with a respective Vnic of the plurality of Vnics; and
receiving, by the audit engine, a listing of allocated VnicTags from a cloud provider, wherein the cloud provider manages resources for the one or more application pods of the containerized software environment, wherein the listing of allocated VnicTags comprises the plurality of allocated VnicTags.

10. The method of claim 8, wherein rectifying, by the audit engine, comprises:
attaching, by the Vnic operator, a first Vnic of the one or more non-active Vnics to a node associated a respective application pod of the containerized software environment; and
injecting, by the Vnic operator, the first Vnic into the respective application pod within the containerized software environment.

11. The method of claim 8, wherein rectifying, by the audit engine, comprises:
decommissioning, by the audit engine, a first Vnic of the one or more non-active Vnics, wherein decommissioning the first Vnic comprises requesting deletion of a port assigned to the first Vnic.

12. The method of claim 8, wherein the method further comprises:
creating, by the Vnic operator, a first Vnic for a first resource managed by a first application pod of the containerized software environment;
creating, by the Vnic operator, a first VnicTag for the first Vnic;
attaching, by the Vnic operator, the first Vnic to a node associated a respective application pod of the containerized software environment; and
injecting, by the Vnic operator, the first Vnic into the first application pod within the containerized software environment.

13. The method of claim 8, wherein the method further comprises:
generating, by the Vnic operator, a VnicTag for each of the plurality of Vnics, wherein the VnicTag comprises:
a pod identifier (pod ID) of an application pod associated with a respective Vnic;
a pod name of the application pod associated with the respective Vnic; and
a namespace of the application pod associated with the respective Vnic.

14. The method of claim 8, wherein the containerized software environment comprises a Kubernetes cluster.

15. The method of claim 8, wherein monitoring, by the audit engine of the Vnic operator, the plurality of Vnics created for deployment within the containerized software environment such that each of the plurality of Vnics is associated with a respective resource managed by the one or more application pods of the containerized software environment comprises:
determining, by the audit engine, an event within the containerized software environment;
requesting, by the audit engine, annotations associated with resources managed by the one or more application pods of the containerized software environment; and
determining, by the audit engine, a status of each Vnic of the plurality of Vnics based on the annotations.

16. A non-transitory computer-readable storage medium comprising processor-executable instructions, wherein the processor-executable instructions comprise a virtual network interface controller (Vnic) operator that manages a plurality of Vnics created for deployment on an application pod of a containerized software environment, each of the plurality of Vnics being directly reachable from a network external to the containerized software environment, wherein the Vnic operator is configured to cause one or more processors to:
monitor a plurality of Vnics created for deployment within the containerized software environment, wherein each of the plurality of Vnics is associated with a respective application pod within the containerized software environment;

determine one or more non-active Vnics within the plurality of Vnics, wherein a non-active Vnic: is a Vnic identified based on a comparison between a plurality of VnicTags associated with the plurality of Vnics and a plurality of allocated VnicTags corresponding to Vnics allocated within the containerized software environment and includes a Vnic that has been allocated but not attached to a node or injected into an application pod; and rectify the one or more non-active Vnics by performing at least one of:

decommissioning the one or more non-active Vnics; or activating the one or more non-active Vnics for use within the containerized software environment.

17. The non-transitory computer-readable storage medium of claim 16, wherein the processor-executable instructions of the Vnic operator to monitor the plurality of Vnics created for deployment within the containerized software environment cause the one or more processors to further execute processor-executable instructions stored in the computer-readable storage medium to:

receive, from the containerized software environment, annotations associated with respective resources managed by the one or more application pods of the containerized software environment;

determine the plurality of VnicTags based on the annotations, wherein each of the plurality of VnicTags is associated with a respective Vnic of the plurality of Vnics; and receive, from a cloud provider, the plurality of allocated VnicTags, wherein the cloud provider manages resources for the one or more application pods of the containerized software environment.

18. The non-transitory computer-readable storage medium of claim 16, wherein:

the processor-executable instructions of the Vnic operator to determine the one or more non-active Vnics within the plurality of Vnics cause the one or more processors to further execute processor-executable instructions stored in the computer-readable storage medium to:

determine that a first application pod is deleted; and determine a first Vnic associated with the first application pod, wherein the one or more non-active Vnics comprise the first Vnic; and the processor-executable instructions of the Vnic operator to rectify the one or more non-active Vnics within the plurality of Vnics cause the one or more processors to further execute processor-executable instructions stored in the computer-readable storage medium to request deletion of a port assigned to the first Vnic based on the first application pod being deleted.

19. The non-transitory computer-readable storage medium of claim 16, wherein the processor-executable instructions cause the one or more processors to further execute processor-executable instructions stored in the computer-readable storage medium to:

determine, based on the plurality of Vnics created for deployment within the containerized software environment, that a first Vnic for a first resource managed by a first application pod is needed;

create the first Vnic for the first resource managed by the first application pod of the containerized software environment; and generate a first VnicTag for the first Vnic;

attach the first Vnic to a node associated the first application pod; and inject the first Vnic into the first application pod within the containerized software environment, wherein the first VnicTag comprises:

a pod identifier (pod ID) of the first application pod;

a pod name of the first application pod; and a namespace of the first application pod.

20. The non-transitory computer-readable storage medium of claim 16, wherein:

the processor-executable instructions of the Vnic operator to determine the one or more non-active Vnics within the plurality of Vnics cause the one or more processors to further execute processor-executable instructions stored in the computer-readable storage medium to determine a first Vnic comprising a non-attachment status, wherein the one or more non-active Vnics comprise the first Vnic; and the processor-executable instructions of the Vnic operator to rectify the one or more non-active Vnics within the plurality of Vnics cause the one or more processors to further execute processor-executable instructions stored in the computer-readable storage medium to:

attach the first Vnic to a node associated with a first application pod of the one or more application pods based on the non-attachment status of the first Vnic; and inject the first Vnic into the first application pod, wherein injecting the first Vnic into the first application pod comprises updating a namespace associated with the first Vnic to the namespace of the first application pod.

* * * * *